United States Patent [19]

Clark et al.

[11] Patent Number: 4,635,255
[45] Date of Patent: Jan. 6, 1987

[54] DIGITAL SUBSCRIBER CONTROLLER

[75] Inventors: Alan T. Clark, Austin, Tex.; Hadi Ibrahim; Arthur F. Lange, both of Sunnyvale, Calif.

[73] Assignee: Advanced Micro Devices, Inc., Sunnyvale, Calif.

[21] Appl. No.: 759,622

[22] Filed: Jul. 26, 1985

[51] Int. Cl.$^4$ .............................................. H04J 3/00
[52] U.S. Cl. ................................................. 370/110.1
[58] Field of Search ....................... 370/110.1, 85, 67; 179/2 DP

[56] References Cited

U.S. PATENT DOCUMENTS

| | | | |
|---|---|---|---|
| 4,381,427 | 4/1983 | Cheal et al. | 370/110.1 |
| 4,394,757 | 7/1983 | Muzumdar et al. | 370/110.1 |
| 4,410,982 | 10/1983 | Fleischfresser et al. | 370/110.1 |
| 4,512,016 | 4/1985 | Fulcomer et al. | 370/110.1 |

*Primary Examiner*—Douglas W. Olms
*Attorney, Agent, or Firm*—Patrick T. King; Kenneth B. Salomon

[57] ABSTRACT

A digital subscriber controller having a number of analog ports and digital ports which can be programmed via an external microprocessor to establish time-division multiplexed bidirectional data paths between three subscriber-selected ports designated as "sources" and three subscriber-selected ports designated as "destinations". Among the ports is a line-interface port having two 64 kilobit-per-second voice/data channels and a 16 kilobit-per-second data control channel. Among the digital ports is a three-channel serial interface port and a two-channel microprocessor interface port. An analog port is also provided at which a variety of audio transducers may be connected. The controller includes a line interface unit, a data link controller which processes data channel information present at the line interface unit, a main audio processor, a microprocessor interface, and a multiplexer which establishes the data paths selected by the subscriber.

8 Claims, 17 Drawing Figures

DIGITAL SUBSCRIBER CONTROLLER

CROSS REFERENCE TO RELATED APPLICATION

Related, co-pending application of particular interest to this invention is application Ser. No. 759,624, filed July 26, 1985, on behalf of Clark etal entitled "Programmable Data-Routing Multiplexer", assigned to the assignee of the instant application.

BACKGROUND OF THE INVENTION

Telephonic subscriber lines today are increasingly employing all-digital networks for both voice and data transmission so as to provide the utmost in signal integrity and flexibility inherent in digital networks. Further benefits accorded to the subscriber include the more efficient provision of existing and new services, such as telephony, packet- and circuit-switched data, telemetry, electronic mail, alarm signaling, telex, facsimile, and banking transactions over the same medium, thereby greatly reducing equipment and space requirements. Additionally, benefits accrue to the telephone company in terms of increased revenue derived from the provision of these new services, and simplified management resulting from all services operating on a single (digital) network.

To provide an interface to such all-digital voice/data networks on the subscriber's premises, the prior art has employed discrete and/or expensive custom circuitry which lacks the flexibility to meet changing subscriber needs. Furthermore such circuitry encourages proliferation of incompatible implementions which vary in physical, electrical and line protocol characteristics. Additionally, the prior art interfaces occupy large amounts of space, have high power consumption thereby generating considerable heat which requires cooling apparatus and lack the reliability of monolithic integrated circuitry.

SUMMARY OF THE INVENTION

The integrated circuit controller chip provided by the instant invention allows the subscriber ready-access to the various data-handling facilities provided by all-digital voice/data telecommunication networks. The controller can be programmed by the subscriber via an external 8-bit microprocessor to perform a number of functions by giving simultaneous access to two 64-kilobit per second (kbs) voice/data channels and a 16-kbs data control channel. Voice-band signals are digitized at the subscriber's terminal and transmitted over one of the 64-kbs channels.

The controller contains seven functional units which support connection of a variety of audio transducers at an analog port of the controller, connection of a digital transducer at a time-multiplexed digital port, and connection of a subscriber-programmable microprocessor at an external bus terminal of the controller. Through programming of the microprocessor, the subscriber can establish bidirectional data flow between any of the ports and the line interface to the telecommunication network.

Among the seven functional units within the controller are a line interface unit which connects the controller via a pair of isolation transformers to the network transmission line; a data link controller which receives control and data information from the line interface unit and transmits subscriber-generated control and data information to the line interface unit for subsequent transmission over the network; a main audio processor which provides analog-to-digital and digital-to-analog conversion of the audio signals received at, and transmitted to, respectively, the analog part of the controller; a microprocessor interface which permits subscriber control of the function and data paths within the controller; and a multiplexer having a serial data port which, as commanded by the subscriber via the external microprocessor, establishes data paths between several possible source and destinations including the line interface unit, the main audio processor, the microprocessor interface and the serial port. Furthermore, the subscriber-programmable multiplexer controls the time-multiplexing of the two voice/data serial channels.

DETAILED DESCRIPTION OF THE PREFERRED EMBODIMENT

A. General

Figure 1:
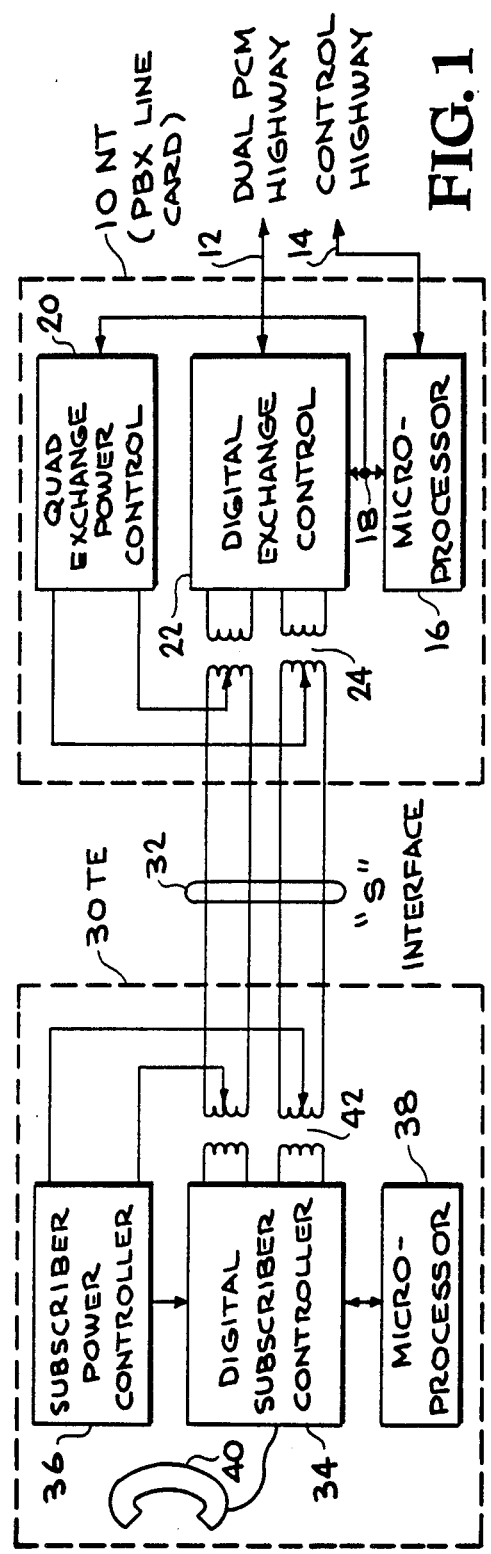
FIG. 1 illustrates employment of a digital subscriber controller (DSC) of the present invention at a subscriber's premises connected to a telephone network local end office via a 192 kbs four-wire interface.

The International Telephone and Telegraph Consultative Committee (CCITT) has recommended a set of standards for digital subscriber access over common interfaces, CCITT I-Series Recommendations which are incorporated herein by reference. A familiarity with these recommendations is useful in understanding the present invention. FIG. 1 illustrates a typical CCITT "S" interface at the subscriber's premises in which a network terminating (NT) element such as the private branch exchange (PABX) line card 10 illustrated is connected to the telephone network local end office via a dual pulse code modulation (PCM) highway 12 carrying simultaneous digital voice and data and a microprocessor control highway 14 carrying microprocessor control signals. The subscriber will have access to two 64 kilo-bit per second (kbs) voice/data ("B") channels and one 16 kbs control/data ("D") channel time-multiplexed bit streams carried on the PCM highway 12.

The PBX line card 10 contains a microprocessor (MPC) 16 which receives the control signals on the control highway 14 and uses them to control the other elements on the line card via signal lines 18. These elements include a quad exchange power controller (QEPC) 20 and a digital exchange controller (DEC) 22.

Figure 2:
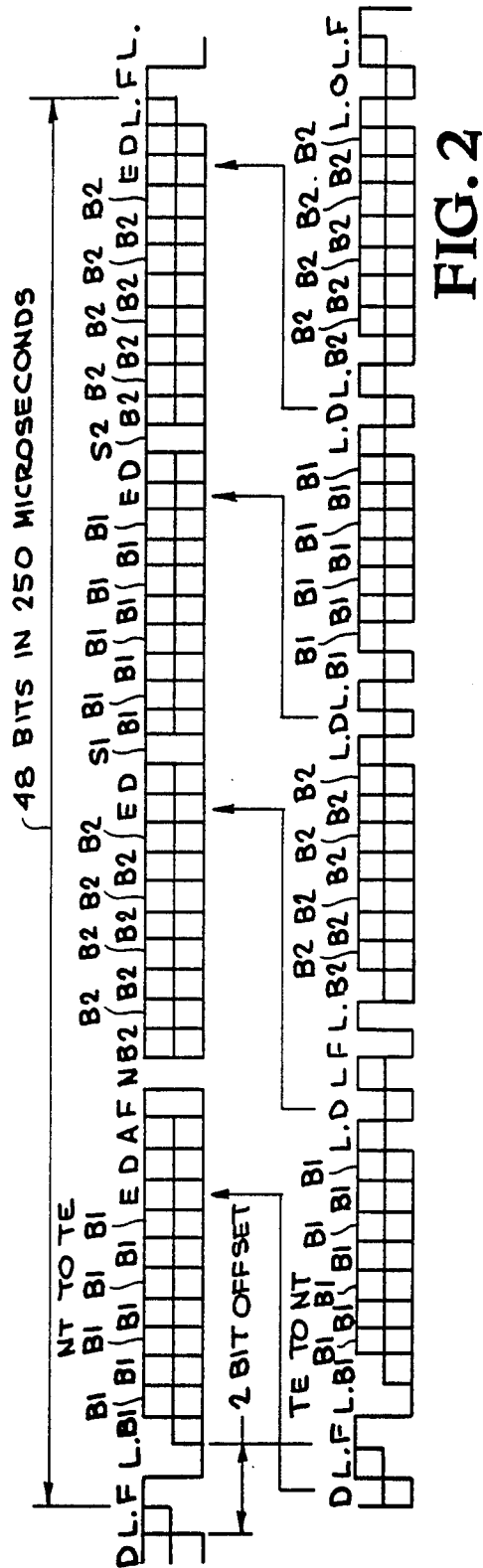
FIG. 2 illustrates the CCITT international standard "S" frame structure.

The PBX line card 10 is connected to the subscriber's terminal equipment (TE) 30 at a full-duplex CCITT four-wire standard ("S") interface 32. This interface implements the CCITT "I"-series recommendations regarding physical, electrical, and line protocol characteristics: it operates at 192 kbs comprising a 64 kbs voice/data "B1" channel, a 64 kbs voice/data "B2" channel, a 16 kbs control/data "D" channel, and a 48 kbs channel carrying frame and maintenance information. The information on the "D" channel control packet follows the LAPD protocol as defined in the CCITT recommendation. The "S" interface frame structure, containing 48 bits with a period of 250 microseconds is illustrated in FIG. 2. The frame is transmitted as a pseudo-ternary code containing framing, DC balancing and contention resolution (D echo bit) for the so-called "point-to-multipoint" configuration of the CCITT recommendation.

The TE 30 contains at its heart a digital subscriber controller (DSC) 34 of the present invention, which supports a variety of "special feature" telephones and provides access to the data-handling facilities present at the "S" interface 32. The DSC 34 can be employed as a microprocessor peripheral to develop the TE 30 as a full workstation. Both the DEC 22 and DSC 34 separate and combine the "S" interface frame of FIG. 2 into the two 64 kbs "B1" and "B2" channels and the 16 kbs "D" channel, and that frame structure shown in the upper portion of FIG. 2 is used to transmit data from DEC 22 to DSC 34, while that shown in the lower portion of FIG. 2 is used to transmit data from DSC 34 to DEC 22.

The TE 30 also includes a subscriber power controller (SPC) 36 and a microprocessor 38. As shown in FIG. 1, in a typical application, TE 30 includes a handset 40 having an earpiece speaker and a mouthpiece microphone connected to the DSC 34 of the instant invention. As mentioned, the DSC supports a wide range of other transducers of either the analog or digital variety.

The full-duplex four-wire "S" interface 32 terminates at a pair of isolating transformers 24 and a pair of isolating transformers 42 connected to the DEC 22 and the DSC 34, respectively. One pair of wires of the four-wire interface 32 comprises a transmit circuit from the DEC 22 to the DSC 34, the other pair of wires comprises a receive circuit from the DSC 34 to the DEC 22.

Figure 3:
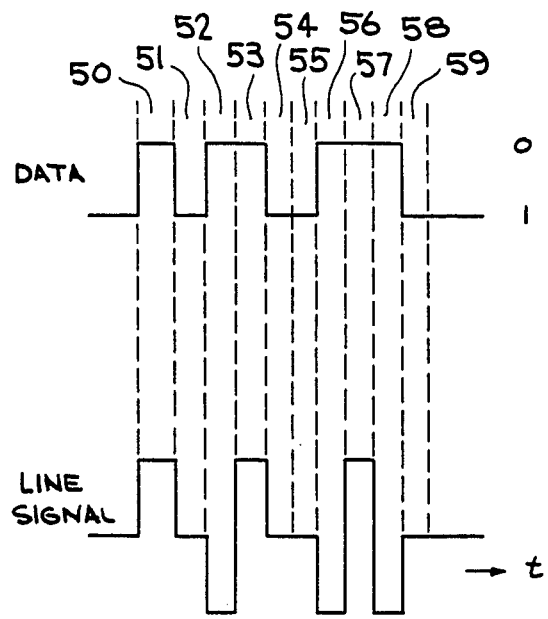
FIG. 3 illustrates the pseudo-ternary coding employed during transmission over the "S" interface.

For both directions of transmission over the "S" interface 32, pseudo-ternary line coding is used with 100% pulse width, as is illustrated in FIG. 3. In this method of coding, data having a value of binary ONE is represented by a space, i.e., zero voltage, in the line signal, such as time slots 51, 54, 55 and 58 of FIG. 3. Data values of binary ZERO are represented by either a high (positive) voltage mark or a low (negative) voltage mark, with the marks alternating in polarity so as to reduce dc offset on the line, such as time slots 50, 52, 53, 55, 56 and 57 of FIG. 3. In this code, any two consecutive high marks or two consecutive low marks represent a code violation which can be used for framing or error detection.

Figure 4:
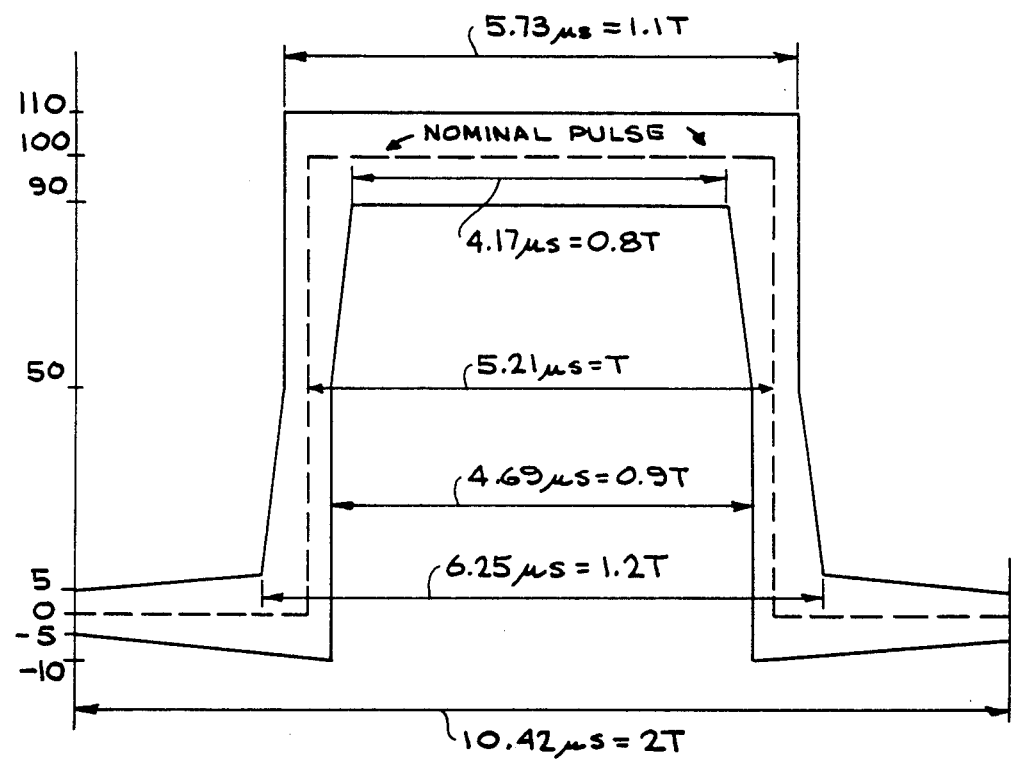
FIG. 4 illustrates the pulse mask used by the transmitter portion of the DSC of the instant invention.

A transmitter portion of the DSC 34 generates at the output winding of transformer 42 100% pseudo-ternary coded pulses conforming to the pulse mask shown in FIG. 4. The same pulse mask is used for both the high and low marks.

B. The Frame Structure

In both directions of transmission, on the transmit circuit from the NT 10 to the TE 30, and on the receive circuit from the TE 30 to the NT 10, the bit-stream is grouped in frames of 48 bits, each as illustrated in FIG. 2. The frame structure is identical for both "point-to-point" and "point-to-multipoint" configurations. Each frame is transmitted at 4 kHz and consists of several groups of bits, as identified in FIG. 2 and described in the following Tables.

The upper portion of FIG. 2 contains the bit-stream frame structure of the NT 10 to TE 30 transmit circuit. Table I, below, contains a description of groups of bits according to their position within the frame. Each individual group is dc-balanced by a trailing balance bit, L-bit.

TABLE I

| TE to NT Frame Structure | |
|---|---|
| Bit Positions | Group |
| 1 and 2 | Framing signal with balance bit |
| 3 to 11 | B1-channel with balance bit |
| 12 and 13 | D-channel with balance bit |
| 14 and 15 | Auxiliary framing/space bit with balance bit |
| 16 to 24 | B2-channel with balance bit |
| 25 and 26 | D-channel bit with balance bit |
| 27 to 35 | B2-channel with balance bit |
| 36 and 37 | D-channel bit with balance bit |
| 38 to 46 | B2-channel with balance bit |
| 47 and 48 | D-channel bit with balance bit |

The lower portion of FIG. 2 contains the bit-stream frame structure of the NT 10 to TE 30 receive circuit. Frames transmitted by the NT 10 contain an ECHO ("E") channel used to retransmit the D-bits received from the TE 10. This channel is used for D-channel access control. The last ("L") bit of the frame is used for balancing each complete frame.

TABLE II

NT to TE Frame Structure

| Bit Position(s) | Group |
| --- | --- |
| 1 and 2 | Framing signal with balance bit |
| 3 to 10 | B1-channel |
| 11 | E-channel bit |
| 12 | D-channel bit |
| 13 | Bit S[1] used for activation |
| 14 | Auxiliary framing (FA) bit |
| 15 | N bit-set to binary one |
| 16 to 23 | B2-channel |
| 24 | E-channel bit |
| 25 | D-channel bit |
| 26 | Bit S[2] used for activation |
| 27 to 34 | B1-channel |
| 35 | E-channel bit |
| 36 | D-channel bit |
| 37 | Zero bit |
| 38 to 45 | B2-channel |
| 46 | E-channel bit |
| 47 | D-channel bit |
| 48 | Frame balance bit |

A line interface portion of the DSC 34 employs frame alignment procedures which make use of the fact that the framing signal is defined to be a line code violation. As shown in FIG. 2, bits 1 and 2 of each frame are always a high mark, low mark sequence. The last mark of any frame is always forced to be a high mark so that bit 1 of the following frame represents a code violation. The first binary ZERO following the framing balance bit is the same polarity as the framing balance bit.

B.1 Frame Alignment Procedure in the Direction NT 10 to TE 30

The DEC 22 forces bit position 14, the FA bit, to a binary ZERO. If no ZEROs are transmitted by the DEC 22 in bit positions 3 through 13, the FA bit is forced to a low mark; in all other cases, the FA bit is generated in accordance with the pseudo-ternary code. Accordingly, a code violation will occur within 13 bits from the framing bit.

The TE 30 searches for line code violations. Having detected a violation, a count of the number of bits until the next violation is initiated. If the count is 13 or less, the distance between the framing and auxiliary framing bits, then the first violation is taken to indicate the true framing position. For any other count value, it is assumed that true framing has not been achieved and the TE 30 continues to search.

The line interface portion of the DSC 34 generates a loss-of-framing signal when a time period equivalent to two 48-bit frames has elapsed without detection of valid pairs of code violations according to the greate-than-or-equal-to 13 criterion described. The DSC 34 halts transmission immediately upon generation of this signal.

When the line interface portion of the DSC 34 receives three cnsecutive pairs of line code violations, obeying the criterion described, the line interface unit generates a signal indicative of the fact that the TE 30 has achieved synchronization.

B.2 Frame Alignment Procedure in the Direction TE 30 to NT 10

The DSC 34 performs frame alignment in the same manner as just described except that, since the line interface portion of the DEC 22 used fixed timing, the FA bit is set in accordance with a buffer internal to the line interface portion of the DSC 34. If this buffer is loaded with a ZERO, the DSC 34 generates a low mark at the FA bit position for transmission in the TE 30 to NT 10 direction.

B. 3 D-Channel Access Protocol

The DSC 34 employs D-channel access protocol which allows for a number of TE's connected in a "point-to-multipoint" configuration to gain access to the D-channel in an orderly fashion. The procedure ensures that even in cases where two or more TE's attempt to access the D-channel simultaneously, one TE will always be successful in completing the transmission of its information. The procedure also permits the TE's to operate in the point-to-point configuration.

Information on the D-channel is transmitted in Layer 2 frames delimited by flags consisting of the binary pattern 01111110. When no TE has information to transmit, the condition on the "S" interface consists of all "ONE"s in both directions of transmission.

The DSC 34 is provided with an echo (E)-channel which permits a TE 30 attached to the DSC to monitor the traffic on the D-channel. An NT 10, on receipt of a D-channel bit from the TE or TE's 30 connected to NT 10, reflect this condition in the transmission toward the TE or TE's in the next-available E-channel bit position.

After a period of time equal to a predetermined number of D-channel bit periods, "X", if the condition of the E-channel remains all binary ONE's, the TE 10 is cleared for transmission. If a binary ZERO occurs during this sensing state, the TE resets its counter and continues to monitor the D-channel. While transmitting information on the D-channel, the TE monitors the received E-channel bit stream and the DLC within the DSC of the TE compares the last transmitted bit with the next received E-bit. If the bit transmitted is the same as the received echo bit, the TE continues transmission. If, however, the received echo is different, the TE creates transmission and returns to the D-channel sensing state.

A TE which has successfully completed the transmission of a Layer 2 frame, increments the contents of its counter, "X", to a value "X+1" and returns to the D-channel sensing state. The counter is reset to "X" when "X+1" binary ONE's have been detected on the E-channel.

Figure 5A:
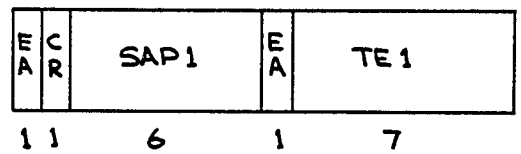
FIGS. 5A to 5C illustrate the various level 2 D-channel frame structures employed by the DSC of the present invention.

Composite FIG. 5 illustrates the various Level 2 frame structures employed on the D-channel in the DSC 34 of the present invention. FIG. 5A illustrates the two-byte address field, comprising an extended address (EA) bit, a command/response (C/R) bit, a service access point indicator (SAPI) six-bit field, an extended address (EA) bit, and a terminal end point indicator (TEI) seven-bit portion.

Figure 5B:

FIG. 5B illustrates one of the Level 2 frame structures comprising the opening flag, the two-byte address, above, an eight-bit control field, a sixteen-bit frame check sequence (FCS), and a closing flag.

Figure 5C:

FIG. 5C illustrates the Level 2 frame structure with the n-bytes of information following the control field. As shown, each frame starts with an opening Flag consisting of a ZERO followed by six ONE's followed by a ZERO. Interframe fill is accomplished by transmitting contiguous ONE's. Upon detection of a collision, a complete frame is retransmitted. In all fields, except the FCS, the lsb is transmitted first.

The MPC 38 causes an internal register to the data link control portion of the DSC 34 to be loaded with the total number of bytes, excluding the two-byte FCS portion, in the packet to be transmitted. If a transmit address buffer internal to the DSC 34 is disabled, this count consists of the control and information bytes plus the address byte count. If the buffer is enabled, the MPC 38 loads the register with a count two-less than the total number of bytes. The data link control portion uses this count information to transmit the FCS and closing flag. A packet consists of a Level 2 frame with the opening and closing flags removed.

B.4 Activation/Deactivation

When the line interface portion of the DSC 34 detects activity on the S-interface 32, the DSC 34 performs the CCITT activation procedure and, upon reception of the Info 4 signal, generates a signal which causes the MPC 38 to undergo an interruption. The line interface portion of the DSC 34 will continue transmission of the framing, but will cease if it receives a deactivation signal from the DSC 34, although the line interface portion will remain fully synchronized as long as NT 10 is transmitting framing. Table III, below, summarizes the DSC 34 activation/deactivation signal procedures. As shown, for an NT 10 to TE 39 activation, the procedure starts with an Info 2 signal from NT 10 TE 30. Info 1 is only used when the TE 30 initiates activation. Info 1 will cease being transmitted from TE 30 when Info 2 is recognized by NT 10, and Info 3 will be transmitted from TE 30 after synchronization is assured.

TABLE III

| Activation/Deactivation Signals | |
|---|---|
| Signals from NT 10 to TE 30 | Signals from TE 30 to NT 10 |
| Info 0 - No signal | Info 0 - No signal |
| Info 2 - Frame with all bits of the B, D, and D-echo channels set to binary ZERO. N and L bits according to the normal coding rules. Bit A set ZERO. | Info 1 - Continuous signal with the pattern: positive ZERO, negative ZERO, six ONE's. Normal bit rate of 192 kbs. |
| Info 4 - Frame with operational data on B, D, and D-echo channels. Bit A set to binary ONE. | Info 3 - Synchronized frames with operational data on B and D channels. |

C. DSC Architecture

Figure 6:
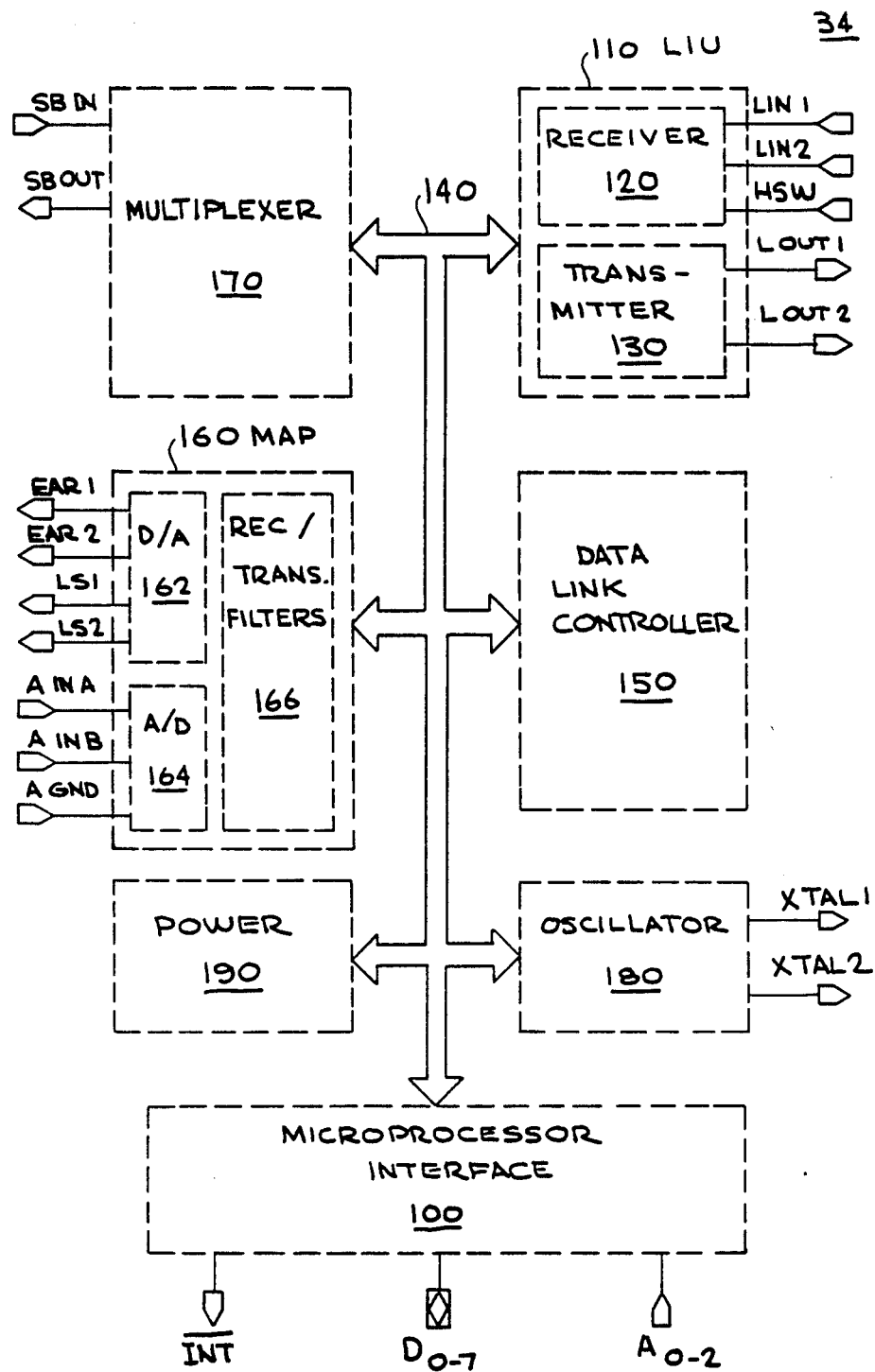
FIG. 6 is a functional block diagram of the DSC of the instant invention.

The digital subscriber controller (DSC) 34 of the present invention consists of seven functional blocks, as illustrated in FIG. 6. The DSC provides digital subscriber access to a telephone network. The DSC is compatible with the CCITT I-series recommendations at reference points "S" and "T". Accordingly, the user of the DSC according to the present invention may utilize terminal equipment (TE) which conforms to international standards.

The DSC 34 can be used in two basic applications as a voice telephone and/or a digital data terminal. When used in a voice-only application, a microprocessor 38 and a keyboard (not illustrated) are required, as well as the SPC 36 and the handset 40, as illustrated in FIG. 1. In this application, the micrprocessor 38 scans the keyboard and constructs Level 3 (protocol) signaling messages for the D-channel.

With reference to FIG. 6, DSC 34 provides a 192 kbs full-duplex digital path for bit-streams received via isolation transformer (42, FIG. 1) on the four-wire interface. (32, FIG. 1) at terminals LIN1 and LIN2, and transmitted on the four-wire interface from terminals LOUT1 and LOUT2. The DSC separates the received bit-stream into the B1 and B2 channels (each 64 kbs), and the D channel (16 kbs). The B channels are routed to different ones of the functional blocks illustrated in FIG. 6 under user control. The D-channel is partially processed at the Level 2 in the DSC 34 and passed via a microprocessor interface (MPI) 100 to a microprocessor (38, FIG. 1) for additional processing. The DSC 34 of the present invention supports both of the two major CCITT recommendations, "point-to-point" and "point-to-multipoint" subscriber configurations, to meet both PBX and public applications.

With reference to FIG. 6, the DSC 34 includes a line interface unit (LIU) 110, connected to the terminals LIN1 and LIN2, which contains a receiver section 120 and a transmitter section 130. The receiver section 120 consists of a receiver filter, a digital phase-lock loop (DPLL) for clock recovery, two slicers for detecting high marks and low marks of the incoming bit-stream frames, and a frame recovery circuit for frame synchronization.

Receiver 120 converts the incoming pseudo-ternary encoded bit stream into binary before conducting it to the other blocks of the DSC 34, illustrated in FIG. 6, via a bus 140. The receiver 110 also performs D-channel access protocol to resolve potential contention when the DSC 34 is operating in the "point-to-multipoint" configuration.

The transmitter section 130 consists of a binary-to-pseudo-ternary encoder and a line driver which receives signals on the bus 140 and causes an outgoing stream to be generated therefrom at the LOUT1 and LOUT2 terminals of the DSC 34. This outgoing bit stream is as specified in the CCITT recommendations for the "S" interface (32, FIG. 1).

The LIU 110 conforms to the CCITT recommendations for level 1 activation and deactivation on the "S" interface 32. This is achieved by transmitting, and decoding, the standard CCITT "Info" signals in accordance with Table III, above. The LIU 110 is also responsive to a signal on a hook switch (HSW) terminal of the DSC 34. The HSW terminal receives a signal indicative of the off-hook or on-hook condition of the handset (40, FIG. 1).

The DSC 34 also includes a data link controller (DLC) 150 connected to the bus 140 which partially processes the 16 kbs D-channel received via the LIU 110. The partial processing of the layer 2 of the protocol includes flag detection and generation, zero deletion and insertion, frame check sequency processing for error detection, and some addressing capability. The external microprocessor 38 initializes the DLC 150 and performs higher level protocol processing. When the DSC 34 is in the receive mode, D-channel data is conducted from the LIU 110 to the DLC 150, via bus 140, and then to the microprocessor interface (MPI) 100 for transmission from a set of eight data terminals (D0, D1, D2, D3, D4, D5, D6, and D7) of the DSC 34 to the external microprocessor. When the DSC is in the transmit mode, D-channel data is conducted from MPI 100 to the LIU 110 via DLC 150 for transmission on the D-channel over the "S" interface 32.

A main audio processor (MAP) 160 contained within the DSC 34 performs digital-to-analog (D/A) conversion within a D/A section 162 and analog-to-digital (A/D) conversion within an A/D section 164 and digital filtering of the signals present in the DSC 34 in a receive/transmit filters section 166. Analog audio signals can be applied to MAP portion of the DSC 34 at earphone teminals (EAR1 and EAR2), two general analog inputs and their associated ground terminal (AINA, AINB, AGND) and analog voice signals are generated by the MAP Portion at loudspeaker terminals (LS1 and LS2).

The MAP 160 transmits and receives digital signals on the bus 140 carrying digital representations of audio signals received at the EAR1, EAR2, AINA, or AINB terminal or to be generated at the LS1 and LS2 terminals, respectively.

A data-routing multiplexer (MUX) 170 portion of the DSC 34 is externally programmable via the microprocessor 38 and, in response, controls the multiplexed bit-streams on the B1 and B2 channels which are received and transmitted to external peripheral devices from the DSC 34 at a serial-B input (SBIN) terminal of the DSC 34 and a serial-B output (SBOUT) terminal of the DSC 34, respectively. The MUX 170 can be programmed to establish a variety of different signal paths via the bus 140 having source and destinations, including: the SBIN terminals, the SBOUT terminal, the MPI 100, the LIU 110, and the MAP 160. The MUX 170 of FIG. 6 selectively routes the 64 kbs B1 and B2 channels among the MPI 100, the LIU 110, and the MAP 160, with internal logical channels designated thereon as Ba (for the MAP), Bb and Bc (for the MPI), Bd, Be and Bf (for the B-serial port), and B1 and B2 (for the LIU). The data-routing MUX 170 is the subject of a related co-pending application Ser. No. 759624, filed 7/26/85 on behalf of Allan T. Clark and Arthur F. Lange, entitled "Programmable Data-Routing Multiplexer," and assigned to the assignee of the instant application. A detailed description of the MUX 170 and the multiplexer control registers and related elements within the MUX 170 is contained in that related co-pending application. The D-channel data is routed to the DLC 150 directly from the LIU 110.

D. DSC Programmable Internal Bus Structure

The MUX 170 contains three multiplexer control registers (MCR1, MCR2, and MCR3), which can be programmed via the MPI 100 to direct data flow along subscriber selected bidirectional data paths shown functionally in FIG. 6 as bus 140.

D.1 Logical Bus Structure

Figure 7:
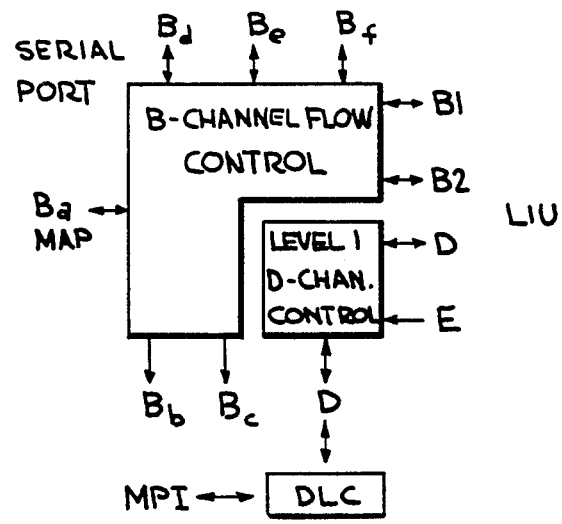
FIG. 7 illustrates the logical data bus structure internal to the DSC of the instant invention which can be configured by MUX 170 by programming from an external microprocessor 100.

The MUX 170 can establish those bidirectional paths between the eight MUX logical parts B1, B2, Ba, Bb, Bc, Bd, Be, and Bf, shown in FIG. 7, as controlled by the contents of MCR1, MCR2, and MCR3. These MCRs are externally programmed to connect any two of the eight logical B-channel ports together by writing an appropriate channel code into the corresponding MCR. Each of the MCR1, MCR2, and MCR3 receives a pair of four-bit channel codes, which, in accordance with Table IV, below, specifies the logical channel interconnections.

For instance, the assignment to MCR1 of the channel codes 0001 and 0100 would establish a bidirectional channel connection of B1 and Bb. A loopback connection can be established by assigning the same pair of channel codes to a particular MCR.

TABLE IV

| MCR1, MCR2, and MCR3 Channel Codes | |
|---|---|
| Code | Channel |
| 0000 | No connection |
| 0001 | B1 (LIU) |
| 0010 | B2 (LIU) |

TABLE IV-continued

| MCR1, MCR2, and MCR3 Channel Codes | |
|---|---|
| Code | Channel |
| 0011 | Ba (MAP) |
| 0100 | Bb (MPI) |
| 0101 | Bc (MPI) |
| 0110 | Bd (Serial B Port Channel 1) |
| 0111 | Be (Serial B Port Channel 2) |
| 1000 | Bf (Serial B Port Channel 3) |

The related, co-pending application referred to above contains a detailed description of the MCR1-4 registers and the manner and apparatus to affect the subscriber-selected data paths within MUX 170 and that description is hereby incorporated by reference.

D.2 Internal Physical Bus Structure

Figure 8:
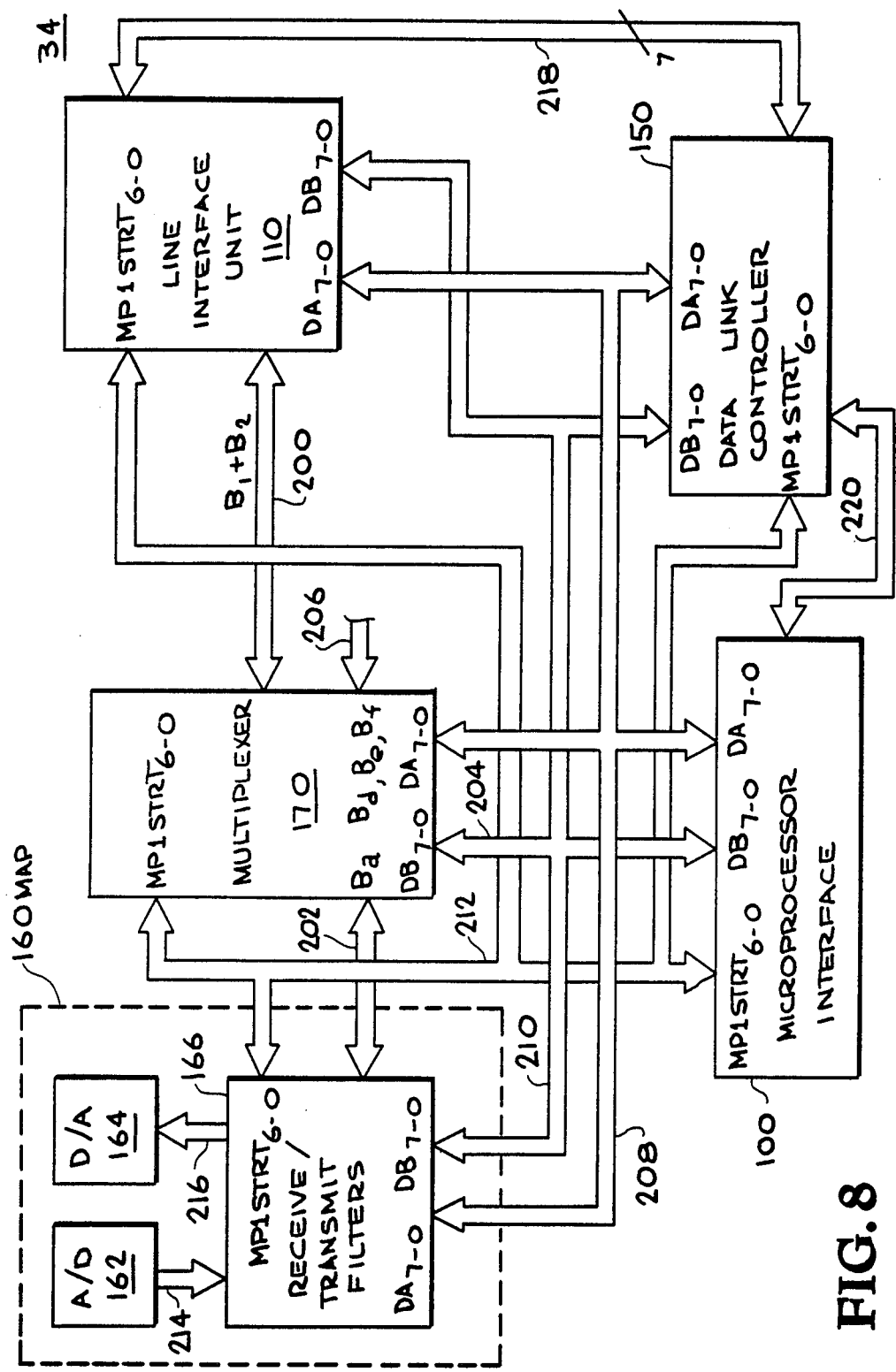
FIG. 8 illustrates the physical data bus structure internal to the DSC of the instant invention which can be configured by MUX 170 by programming from an external microprocessor 100.

The bus structure internal to the DSC 34, shown functionally as bus 140 on FIG. 6 is illustrated in FIG. 8. Shown thereon are the B-channel bidirectional data paths B1 and B2; Ba; Bb and Bc; and Bd, Be and Bf referred to in section D.1, above, designated 200, 202, 204 and 206, respectively, on FIG. 8. In addition, shown on FIG. 8 are three control busses 208, 210 and 212 which interconnect ports $DA_{0-7}$, $DB_{0-7}$ and $MPISTRT_{0-6}$, respectively of the MPI 100 with the ports $DA_{0-7}$, $DB_{0-7}$ and $MPISTRT_{0-6}$ of the LIU 110, the DLC 150, the receive/transmit filters 166 of MAP 160, and the MUX 170.

As shown on FIG. 8, data bus 200 connects LIU 110 and the B1, B2 port of MUX 170; data bus 202 connects receive/transmit filters 166 section of MAP 160 and the Ba port of MUX 170; data bus 204 connects the MPI 100 and the $DB_{0-7}$ port of MUX 170; data bus 206 connects the Bd, Be and Bf port integral with MUX 170 to the SBIN, SBOUT terminals of DSC 34. As used herein, data bus 206 indentifies that portion of control bus 210 which interconnects MPI 100 and MUX 170.

The contents of the MCR1, MCR2, and MCR3 registers determines the particular interconnection implemented on data busses 200, 202, 204 and 206, as described in Section D.1, above, in accordance with Table IV. The manner in which the subscriber programs the MCR1, MCR2, and MCR3 registers, as well as the other user-accessible registers within the DSC 34 is described in Section E, below.

As shown in FIG. 8, the A/D 162 section of MAP 160 is connected to the receive/transmit filters 166 section of MAP 160 by a bus 214, and the D/A 164 section to the filters 166 by a bus 216. The LIU 110 portion of DSC 34 is connected via a data bus 218 to DLC 150. This bus conducts the D-channel information directly from LIU 110 to DLC 150.

E. The Microprocessor Interface

Figure 9:
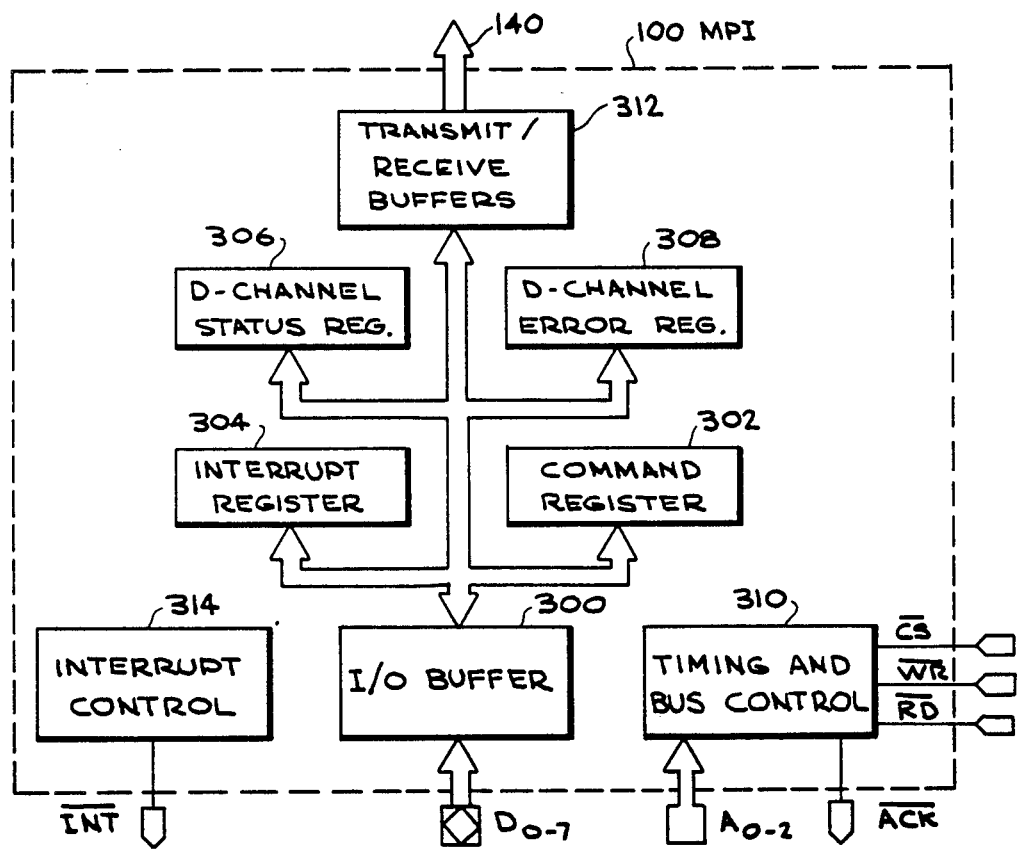
FIG. 9 is a block diagram of the microprocessor interface portion of the DSC of the present invention.

The DSC 34 of the present invention includes a number of programmable registers and filters which can be accessed via the microprocessor interface (MPI) 100. FIG. 9 illustrates the internal structure of the MPI 100, which includes an input/output (I/O) buffer 300, and command register (CR) 302, an interrupt register (IR) 304, D-channel status register (DSR) 306 and D-channel error register (DER) 308. The CR 302, IR 304, DSR 306 and DER 308 are user-accessible via the $D_{0-7}$ terminals of the DSC 34 and the I/O Buffer 300.

The signals (H=HIGH signal level, L=LOW signal level, X=either HIGH or LOW signal level) the $A_{0-2}$ address terminals and signals at a chip select (~CS), a read (~RD) enable, and a write (~WR) enable terminal of DSC 34 determine which register is to be accessed is in accordance with Table V, below, under control of the timing and bus control circuit 310. (As used herein, signals preceded by the symbol "~" are active LOW.) The logical bus 140 (FIG. 6) shown in FIG. 9 corresponds to the physical busses 204, 208 and 212 shown in FIG. 8 interconnecting the MPI 100 with the other elements of the DSC 34 shown in FIG. 8. Timing and bus control circuit 310 allocates these physical busses in accordance with Table VI, below as will be appreciated by those skilled in the art.

Table V refers to a number of so-called "direct" registers which reside in the MPI section of the DSC 34. The transmit (TxD) and receive (RxD) buffers referred to on lines seven through twelve represent one of a number of buffers, shown generally on FIG. 9 as transmit/receive buffers 312, within the MPI 100.

The DSR 306, the DER 308 and the IR 304 are each eight-bit registers which are subscriber-accessible via the MPI 100. These registers are associated with the DLC 150 and their contents can be written by the DLC 50 and received by the MPC 38 via the MPI 100.

Table VI also refers to a number of so-called "indirect" registers which do not reside in the MPI 100 section of the DSC 34. The "Data Register" referred to on lines three and four, thereof, represents any of a number of programmable registers within the other sections of the DSC 34.

TABLE V

| MPI 100 Direct Register Access | | | | | | |
|---|---|---|---|---|---|---|
| CS | ~RD | ~WR | A[2] | A[1] | A[0] | Register(s) Accessed |
| L | H | L | L | L | L | CR, write only |
| L | L | H | L | L | L | IR, read only |
| L | H | L | L | L | H | Data Register, write |
| L | L | H | L | L | H | Data Register, read |
| L | L | H | L | H | L | DSR, read only |
| L | L | H | L | H | H | DER, read only |
| L | H | L | H | L | L | D-channel T×D buffer, write only |
| L | L | H | H | L | L | D-channel R×D buffer, read only |
| L | H | L | H | L | H | Bb-channel T×D buffer, write only |
| L | L | H | H | L | H | Bb-channel R×D buffer, read only |
| L | H | L | H | H | L | Bc-channel T×D buffer, write only |
| L | L | H | H | H | L | Bc-channel R×D buffer, read only |
| L | H | L | H | H | H | FA T×D buffer, write only |
| L | L | H | H | H | H | S/FA R×D buffer, read only |
| H | X | X | X | X | X | No access |

Figure 10:
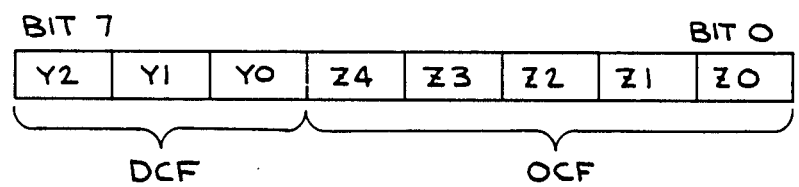
FIG. 10 illustrates the meaning associated with the contents of the command register within microprocessor interface 100.

The CR 302 consists of an eight-bit register as shown in FIG. 10. The CR 302 is subdivided into a three-bit (Y2, Y1, Y0) field containing the destination code field (DCF) and a five-bit (Z4, Z3, Z2, Z1, Z0) field containing the operational code field (OCF). The "Y" bits of the DCF define which section of the DSC 34 is to be accessed by the user via the MPI 100, in accordance with Table VI, below. The "Z" bits of the OCF define which Data Register(s) within the section of the DSC 34 specified by the DCF of the eight-bit contents of the command register, in accordance with Table VII, below.

TABLE VI

| Destination Code Field of Command Register | | | |
|---|---|---|---|
| DCF | | | |
| Y2 | Y1 | Y0 | DSC Section |
| 0 | 1 | 0 | MUX 170 |
| 0 | 1 | 1 | MAP 160 |
| 1 | 0 | 0 | DLC 150 |
| 1 | 1 | 0 | LIU 110 |

TABLE VII

| Operational Code Field of Command Register | | | | | | | |
|---|---|---|---|---|---|---|---|
| DSC Portion | Z4 | Z3 | Z2 | Z1 | Z0 | Filters and/or Data Register(s) Accessed | Bytes Transferred |
| INIT | 0 | 0 | 0 | 0 | 1 | Read/Write INIT register | 1 |
| LIU 110 | 0 | 0 | 0 | 0 | 1 | Read LSR | 1 |
| LIU 110 | 0 | 0 | 0 | 1 | 0 | Read/Write LPR | 1 |
| LIU 110 | 0 | 0 | 0 | 1 | 1 | Read/Write LMR1 | 1 |
| LIU 110 | 0 | 0 | 1 | 0 | 0 | Read/Write LMR2 | 1 |
| LIU 110 | 0 | 0 | 1 | 0 | 1 | Read/Write LPR, LMR1-2 | 3 |
| MUX 170 | 0 | 0 | 0 | 0 | 1 | Read/Write MCR1 | 1 |
| MUX 170 | 0 | 0 | 0 | 1 | 0 | Read/Write MCR2 | 1 |
| MUX 170 | 0 | 0 | 0 | 1 | 1 | Read/Write MCR3 | 1 |
| MUX 170 | 0 | 0 | 1 | 0 | 0 | Read/Write MCR4 | 1 |
| MUX 170 | 0 | 0 | 1 | 0 | 1 | Read/Write MCR1-4 | 4 |
| MAP 160 | 0 | 0 | 0 | 0 | 1 | Read/Write MAP Filter Coeffs | 16 |
| MAP 160 | 0 | 0 | 0 | 1 | 0 | Read/Write MAP Filter Coeffs | 16 |
| MAP 160 | 0 | 0 | 0 | 1 | 1 | Read/Write MAP Filter Coeffs | 2 |
| MAP 160 | 0 | 0 | 1 | 0 | 0 | Read/Write MAP Filter Coeffs | 2 |
| MAP 160 | 0 | 0 | 1 | 0 | 1 | Read/Write MAP Filter Coeffs | 2 |
| MAP 160 | 0 | 0 | 1 | 1 | 0 | Read/Write Sidetone Gain | 2 |
| MAP 160 | 0 | 0 | 1 | 1 | 1 | Read/Write TONE REG 1 and 2 | 2 |
| MAP 160 | 0 | 1 | 0 | 0 | 0 | Read/Write TONE REG 1 and 2 | 2 |
| MAP 160 | 0 | 1 | 0 | 0 | 1 | Read/Write MODE REG 1 | 1 |
| MAP 160 | 0 | 1 | 0 | 1 | 0 | Read/Write MODE REG 2 | 1 |
| MAP 160 | 0 | 1 | 0 | 1 | 1 | Read/Write all MAP Filters/Registers | 46 |
| DLC 150 | 0 | 0 | 0 | 0 | 1 | Read/Write three 1st Receive Byte Registers | 3 |
| DLC 150 | 0 | 0 | 0 | 1 | 0 | Read/Write three 2nd Receive Byte Registers | 3 |
| DLC 150 | 0 | 0 | 0 | 1 | 1 | Read/Write Transmitter Address Register | 2 |
| DLC 150 | 0 | 0 | 1 | 0 | 0 | Read/Write three D-channel Record Byte Count Register | 6 |
| DLC 150 | 0 | 0 | 1 | 0 | 1 | Read/Write D-channel Trans Byte Count Register | 2 |
| DLC 150 | 0 | 0 | 1 | 1 | 0 | Read/Write DMR1 | 1 |
| DLC 150 | 0 | 0 | 1 | 1 | 1 | Read/Write DMR2 | 2 |
| DLC 150 | 0 | 1 | 0 | 0 | 0 | Read/Write all DLC except RNG Registers | 18 |
| DLC 150 | 0 | 1 | 0 | 0 | 1 | Read Receive Byte Count Reg | 2 |
| DLC 150 | 0 | 1 | 0 | 1 | 0 | Read/Write lsb of RNG | 1 |
| DLC 150 | 0 | 1 | 0 | 1 | 1 | Read/Write msb of RNG | 1 |

The LIU status register (LRS), the LIU D-channel priority register (LPR) and the two LIU mode registers LMR1 and LMR2) are programmable registers within the LIU 110 section of the DSC 34. The MCR1-4 registers were described above in section D.1 in connection with the logical B channels and the interrupt codes of the MUX 170.

Finally, the three first, and three second, receive byte address registers, the transmit address register, the three D-channel Receive byte count registers, the D-channel transmit byte count register, the random number generator (RNG) register, and two D-channel mode registers (DMR1 and DMR2) are programmable registers within the DLC 150 section of the DSC 34.

To read from or write to any of the indirect registers, i.e., those not within the MPI 100 as shown in the Direct Register Access Table V, a command word is first written to the CR 302. Depending on the contents of the DCF and OCF fields of the command word, in accordance with Tables VI and VII, one or more data bytes will be transferred to the register(s) selected; the last column of Table VII indicating how many data bytes are transferred.

F. Line Interface Unit

Figure 11:
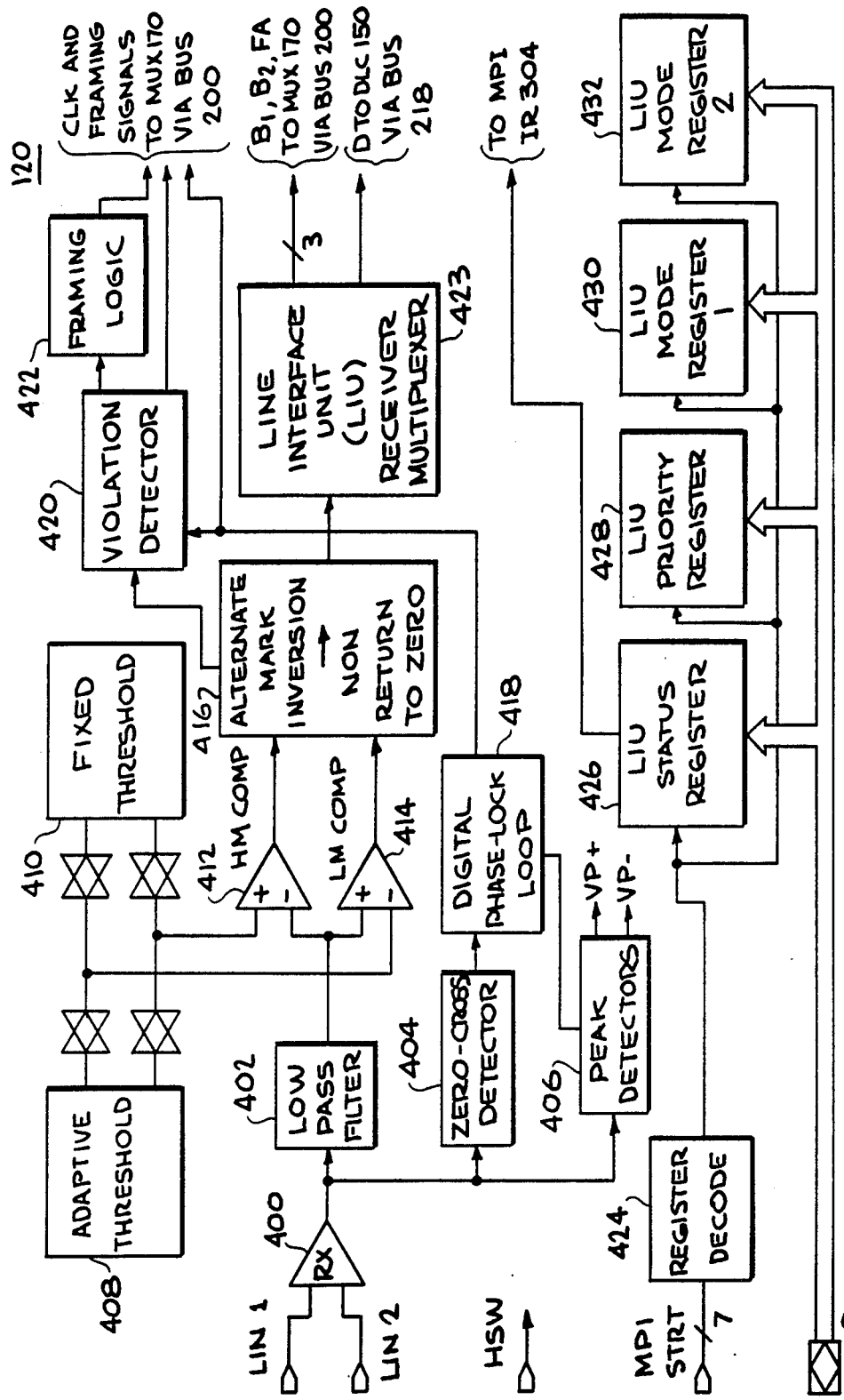
FIG. 11 is a block diagram of the receiver portion of the line interface unit of the DSC of the present invention.
Figure 12:
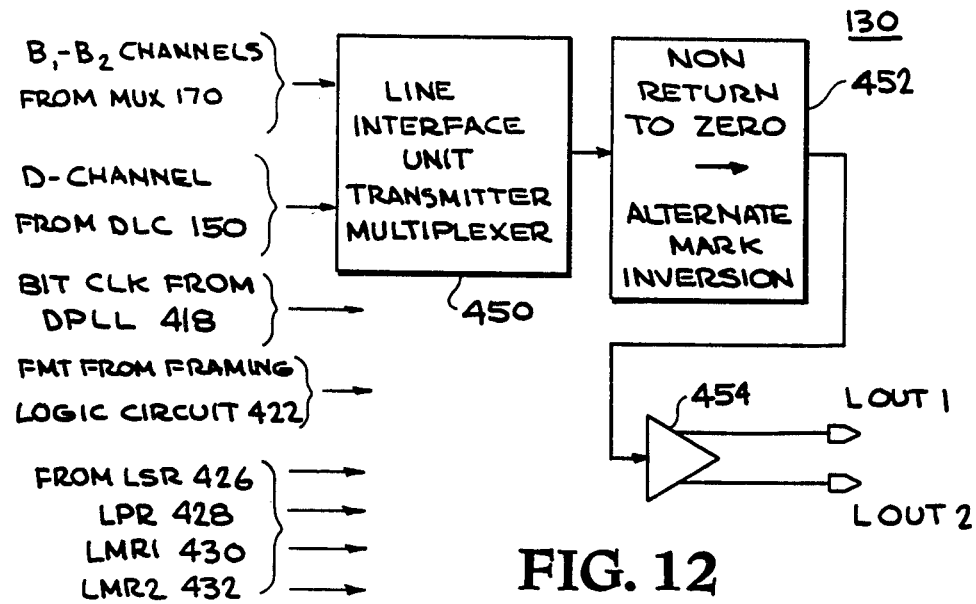
FIG. 12 is a block diagram of the transmitter portion of the line interface unit of the DSC of the present invention.

The DSC 34 of the present invention includes the LIU 110, having a receiver section 120 with the internal structure shown in FIG. 11, and a transmitter section 130 with the internal structure shown in FIG. 12.

F.1 LIU Receiver

The receiver section 120 of the DSC 34 receives AMI coded data over the "S" interface at the line input terminals LIN1 and LIN2 and extracts clock, framing and data signals. With reference to FIG. 11, the receiver contains a receive amplifier 400 connected to the terminals LIN1 and LIN2. The output of amplifier 400 is connected to a low-pass filter 402, a zero-cross detector circuit 404, and a peak detectors circuit 406.

The receiver section 120 employs adaptive threshold circuitry 408 and fixed threshold circuitry 410 to detect the signals at the line input terminals. The thresholds are determined by the amplitude of the signals. A high-mark comparator (HM COMP) 412 and a low mark comparator (LM COMP) 414 form slicers for the received signals. An AMI-to-NRZ converter 416 is connected to the outputs of the slicers 412 and 414 and generates the signals representing the data portion of the received frame information as shown in FIG. 4, above.

The signals received at the LIN1 and LIN2 terminals are AMI coded signals with framing and DC balance bits as described in connection with FIG. 4, above. The Zero-cross detector 404 supplies a signal to a digital phase lock loop (DPLL) circuit 418 which provides timing recovery and internal 414 clocks. The DPLL 418 employs an internal clock of frequency 6.122 mHz, providing a bit clock with a maximum jitter of 1/64 bit. The timing recovery signals generated by the DPLL 48 are conducted to the Peak detectors 406.

Figure 13:
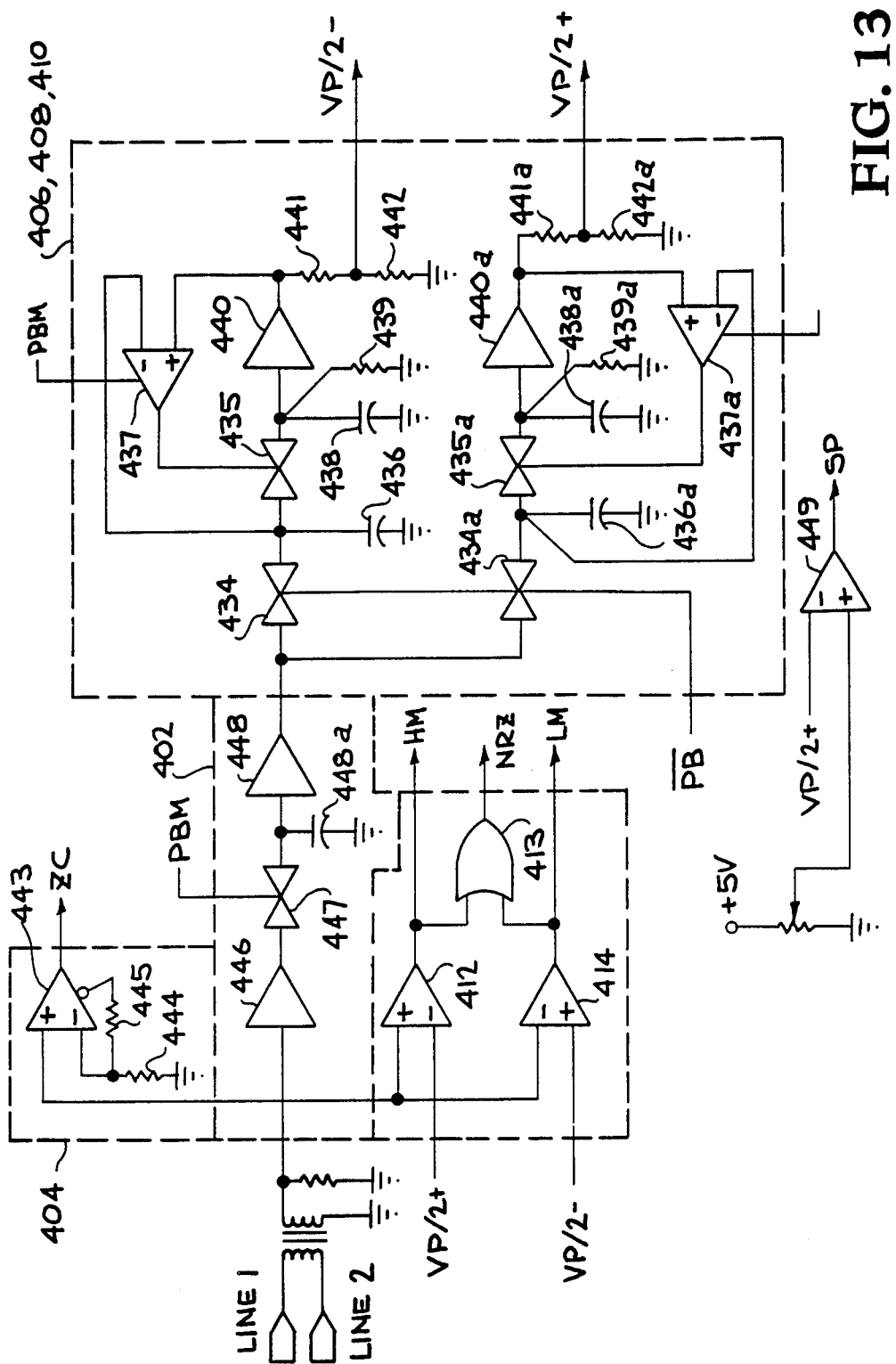
FIG. 13 is a logic diagram of the analog circuitry within the receiver portion of the line interface unit of the DSC.

The operation of the aforementioned circuit comprising elements 400-416 is best understood with reference to FIG. 13. The elements labelled 400-418 in FIG. 11 of the block diagram of the receiver section 120, are illustrated in greater detail in the logic diagram, FIG. 13. As shown, peak detectors circuit 406, adaptive threshold circuit 408 and fixed threshold circuit 410 are implemented by the circuitry within the dashed border on the right side of FIG. 13. Time-division switches 434 and 435, a capacitor 436, a comparator 437, and a capacitor 438 and a resistor 439 comprise a negative peak detector and switches 434a and 435a, a capacitor 436a, a comparator 437a, and a capacitor 438a and a resistor 439a comprise a positive peak detector. As shown, one terminal of switches 434 and 434a are tied in common and form the input to the peak detectors circuit 406. The second terminals of switches 434, and 434a, are connected to a junction with a first terminal of switch 435, switch 435a, respectively, a terminal of capacitor 436, capacitor 436a respectively, and the negative input of comparator 437, comparator 437a, respectively. The second terminal of capacitors 436 and 436a are connected to ground. The second terminals of switch 435, and 435a, are connected to a junction of a first terminal of capacitor 438a, respectively, and a first terminal of resistor 439, resistor 439a, respectively. The junctions so formed are connected to the input of an operational amplifier 440, operational amplifier 440a, respectively. The output of operational amplifier 440, amplifier 440a, is connected to the positive input of comparator 437, comparator 437a, respectively, as well as to a voltage-divider network of series-tied resistors 441 and 442, resistors 441a and 442a, respectively, which produce the output VP/2−, VP/2+, respectively. The second terminals of capacitors 438 and 438a, and resistors 439 and 439a are connected to ground.

A signal ∼PB is applied to the switches 434 and 434a and a signal PBM is applied to operational amplifiers 437 and 437a to effective time-division.

As shown in FIG. 13, zero-crossing detector circuit 404 comprises a comparator 443 with its positive input receiving the signals applied at the "S" interface and its negative input connected to ground via resistor 444. A resistor 445 connects the negative input to the complement output of the amplifier 443.

Low pass filter 402 (FIG. 11) consists of the series connection of operational amplifiers 446, switch 447, and operational amplifier 448. The input of operational amplifier 448 is connected to ground via a capacitor 448a.

The negative input to high-mark comparator 412 receives the VP/2− signal generated at the voltage divider resistors 441a and 442a and the positive input to low-mark comprator 414 receives the VP/2+ signal generated at the voltage-divider resistors 441 and 442. The inputs to an "OR" gate 413 is connected to the outputs of comparators 412 and 44 and a non return to zero (NRZ) signal is generated at the output of "OR" gate 413.

Switch 434 (respectively, 434a) is set on four times during every inter-bit period to effect charging of capacitor 436 (respectively, 436a) to the amplitude of the signal applied at the line input terminals. If the voltage across capacitor 436 (respectively, 436a) is less than (respectively, greater than) that across capacitor 438 (respectively, 438a), comparator 437 (respectively, 437a) causes switch 435 (respectively, 435a) to be set on. Accordingly, capacitor 438 (respectively, 438a) is charged to the negative (respectively, positive) peak amplitude.

The negative (respectively, positive) peak amplitudes so generated are buffered by amplifiers 440 (respectively, 440a) and voltage-divided to produce the slicer level signal VP/2− (respectively, VP/2+). The attack time of the peak detectors circuit 406 is determined by the ratios of the values of capacitor 436 to capacitor 438 (respectively, 436a to 438a), while the decay time is proportional to the time constant determined by capacitor 438 and resistor 439 (respectively, 438a and 439a).

Slicer output signals VP/2− and VP/2+ are applied to HM COMP 412 and LM COMP 414 which are used to obtain the LM, HM and NRZ signals. A comparator 449 generates a signal present (SP) signal by receiving at the negative input the VP/2+ signal and at the positive input an adjustable threshold voltage being between 0 voltage and 5 volts.

A frame recovery logic (FRAMING LOGIC) circuit 422 receives the output of the violation detector 420 as well as the timing signals generated by the DPLL 418. This circuit 422 generates frame mark (FM) and frame lock (FL) acquired signals conforming to the CCITT requirements for the Info2 recognition.

Each 48-bit "S" frame begins with a frame mark which is coded as an AMI code violation (two consecutive HIGH signals), as described in connection with FIG. 2. As described, a second violation should occur within fourteen bits of the first violation. These violations are detected by violation detector circuit 420 and signals generated therefrom are conducted to the framing logic circuit 422.

The clock and framing signals generated by the violation detector circuit 420 and the DPLL circuit 418 are conducted to the MUX 170 via bus 200. The data portion of the received frame generated by the AMI-to-NRZ circuit 416 is conducted to a LIU receiver multiplexer. (LIUR MUX) 423 and therefore is transmitted as channel B, and B[2] and the FA signal MUX 170 via bus 200, and the channel D to the DLC 150 via bus 218.

A register decode circuit 424 receives the signals representing a register $DA_{0-7}$ address via bus 208. These address signals are conducted to the eight-bit LIU status register (LSR) 426, the eight-bit LIU D-channel priority register (LPR)428, the two eight-bit LIU mode registers (LMR1 and LMR2) 430 and 432, mentioned above in connection with MPI 100, all user-accessible registers. These registers 421, 428, 430 and 432 are MPC 38 accessible registers and contain LIU status information. They are connected to various elements within the receiver section 120 of the DSC 34 by signal lines (not shown in FIG. 11) to monitor and program conditions via MPI 100.

F.2 LIU Transmitter

The transmitter section 130 of the DSC 34 receives the binary B1 and B2-channel bit streams from the MUX 170 and the D-channel from the DLC 150 and couples them to the "S" interface 32 through an external isolation transformer 42. With reference to FIG. 12, the transmitter 130 consists of an LIU transmitter multiplexer (LIUX MUX) 450, an NRZ to AMI encoder 452 and a line driver 454 conforming to CCITT specification. The frame mark in the transmitted frame is two bits delayed from that of the received frame, see FIG. 4, above. The transmitter 130 generates 100% pseudo ternary coded pulses conforming to the pulse mask shown in FIG. 3, above. The design and operation of transmitter section 130 of LIU 110 is conventional, and, in view of the detailed description given above in connection with the receiver section 120 of the LIU 110, can be understood by those skilled in the art without further description.

G. Data Link Controller

Figure 14:
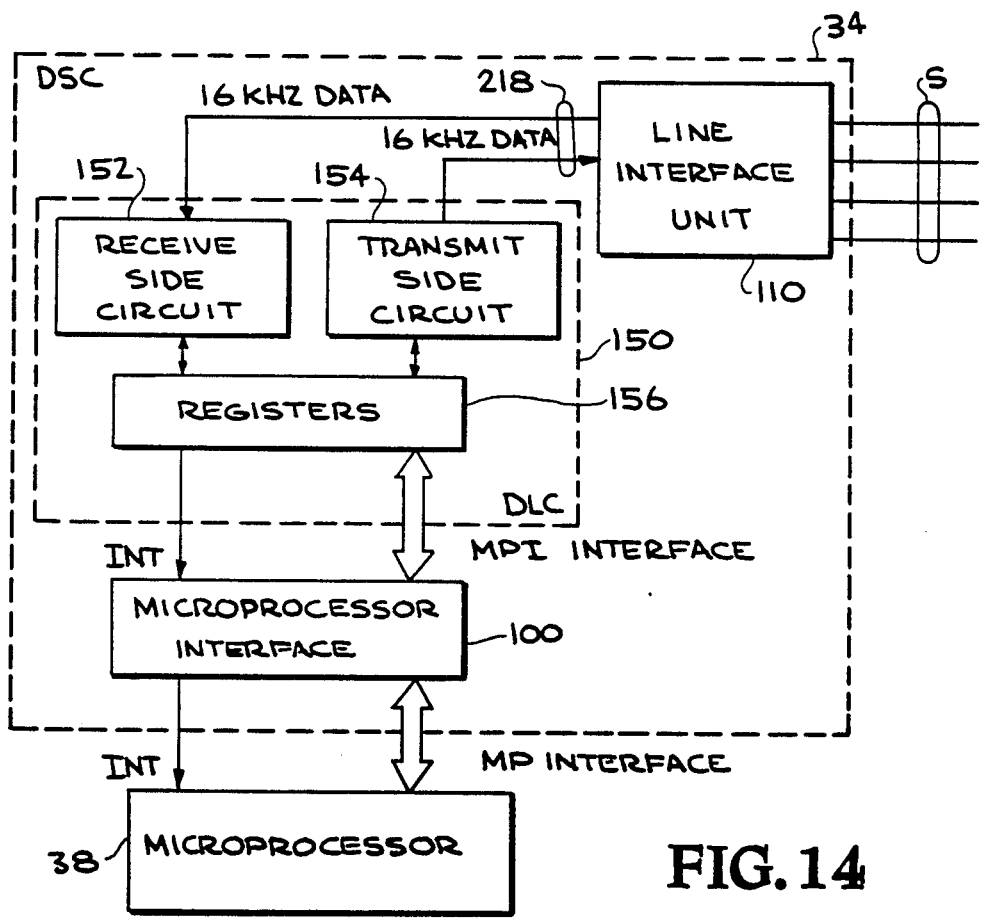
FIG. 14 is a block diagram of the data link controller portion of the DSC of the present invention.

The DLC 150 of the DSC 34 of the present invention, interfaces to the LIU 110 using serial data and control channels and to the external MPC 38 via MPI 100 using registers internal to the DLC 150, as illustrated in FIG. 14. As shown, DLC 150 includes a receive side circuit 152, a transmit side circuit 154 and registers 156. The DLC receiver and transmit sides are connected to LIU via bus 218 (FIG. 8).

The DLC 150 contains logic circuitry to implement partial LAPD level 2 protocol as described in section B.3, above. The DLC 150 permits subscriber-access via the MPI 100 to process the information and control fields shown in the Level 2 frame of FIG. 5C, above. The MPC 38 may process the address field of the frame, if the registers 156 internal to the DLC 150 are appropriately programmed. The internal status of the DLC 150 is stored in the DSR 308 of the MPI 100, as previously described in connection with the MPI 100. The DLC 150 also contains a random number generator (RNG) circuit which is used in conjunction with the address allocation procedure for Level 2 initializations and is user-accessible via the MPI 100.

G.1 DLC Receive Side

Figure 15:
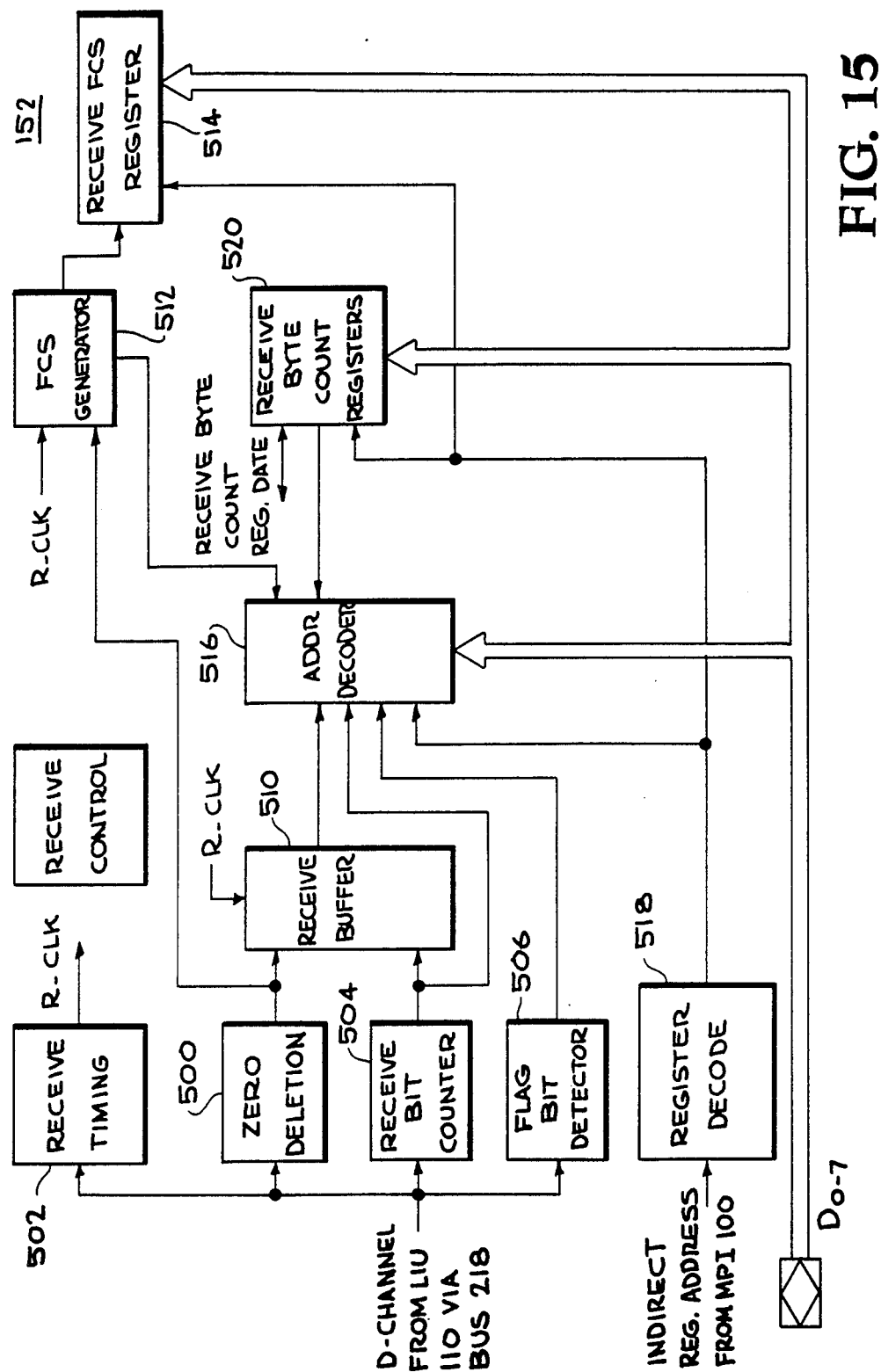
FIG. 15 is a block diagram of the receive side portion of the data link controller portion of the DSC.

FIG. 15 is a block diagram of the receive side 152 of the DLC 150 of the present invention. The 16 kbs D-channel data is received from the LIU receiver section 120 at a zero deletion circuit 500, the D-channel frame is examined by circuit 500 and by ZERO following five continuous ONE's is discarded by zero deletion circuit 500, as described in connection with the LIU 110 section, above. The 16 kbs D-channel data is also received by a receive-side timing circuit 502, a receive-side bit counter 504 and a flag bit detector 506.

The output of the zero deletion circuit 500 is conducted to a receive buffer 510 and a frame checking sequence (FCS) generator 512. The FCS generator 512 circuit generates a 16-bit sequence in accordance with CCITT recommendation X.25 paragraph 2.2.7, using a cyclic redundancy check code (CRC), with a generator polynomial $X^{16}+X^{12}+X^5+1$. The resulting FCS generated by FCS generator 512 is stored in a receive FCS register 514 which is user-accessible via MPI 100.

The received D-channel bit-stream is conducted via the zero deletion circuit 500 to a receive buffer 510, which also receives the output of the receive bit counter 504 as well as receive wide clock timing signals (R CLK) generated by receive timing circuit 502. The buffer 510 is connected to an address decoder circuit 516, which contains the three first receive byte address registers, the three second byte address registers, and the random number generator (RNG) register. The address decoder 516 also is connected to the $DA_{0-7}$ address bus 208. These are all eight-bit registers and are read/write user-accessible via the MPC 38 and the MPI 100.

The contents of the registers within the address decoder 516 are available via a register decode circuit 518 and the $D_{0-7}$ bus, as is the contents of the receive FCS register.

G.2 DLC Transmit Side

Figure 16:
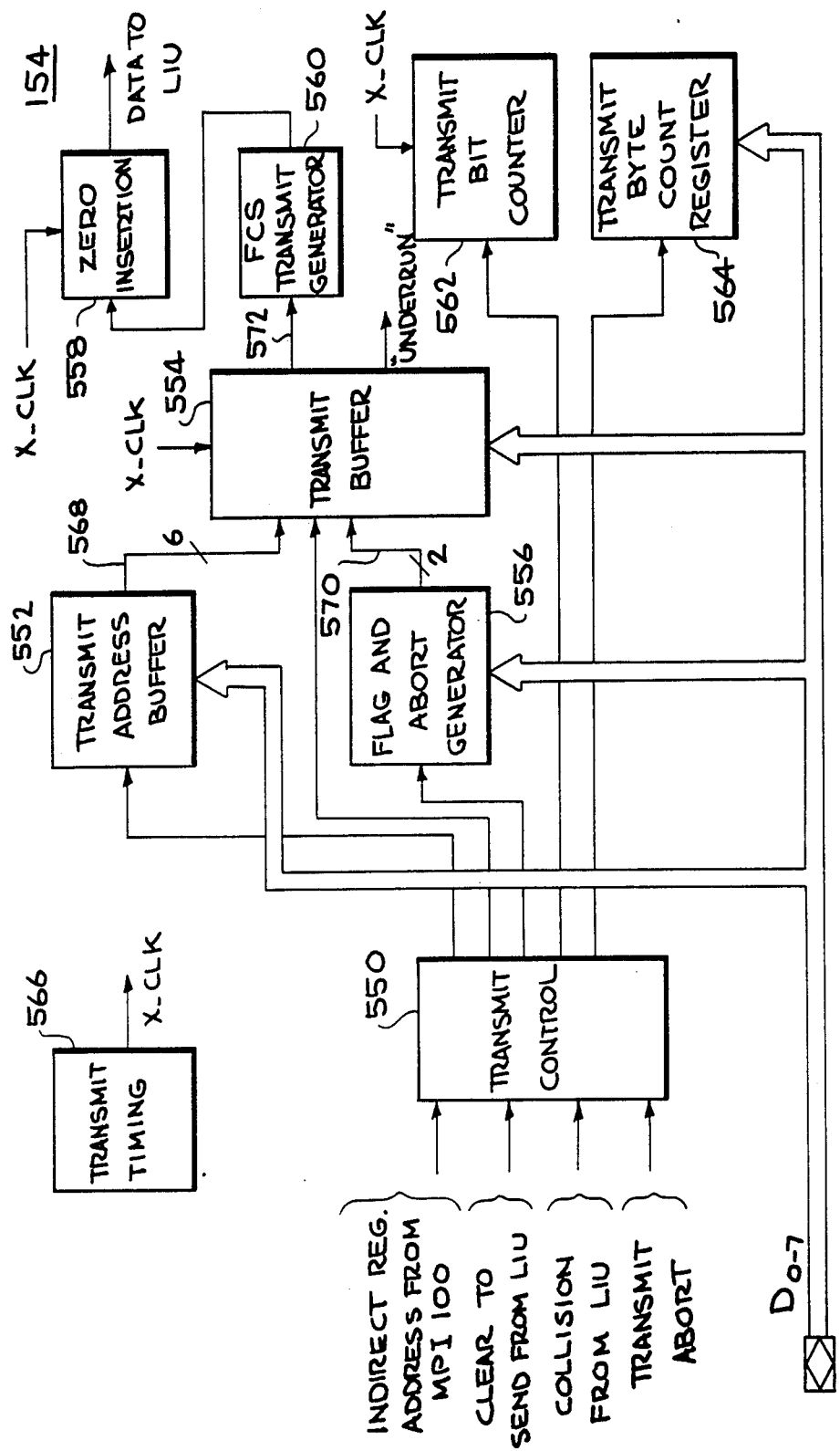
FIG. 16 is a block diagram of the transmit side portion of the data link controller portion of the DSC.

FIG. 16 is a block diagram of the transmit side 154 of the DLC 150 of the present invention. As shown, a transmit control circuit 550 receives collision information, transmitted abort information and clear to send information from the LIU 110. The transmit control circuit 550 generates various control signals therefrom to a transmit address buffer 552, a transmit buffer 554, a flag and abort generator 556, a zero insertion circuit 558, a FCS transmit circuit 560, a transmit bit counter register 562 and a transmit byte counter register 564. A transmit timing clock generator 566 generates a transmit clock (X CLK) signal which is applied to the zero-insertion circuit 558, the transmit bit counter 562 and the transmit buffer 554.

The control signal received by the transmit address buffer 552 causes the first and/or second address received by the buffer 552 via the DA-bus$_{0-7}$ to be loaded into the buffer 552. This address data is conducted to the transmit buffer via a 6-conductor signal line 568. Flag and abort signals generated by the flag and abort generator 556 are conducted to the transmit buffer 554 via 2-conductor signal line 510, under control of transmit control circuit 550.

The partial frame contained in transmit buffer 554 is conducted in serial fashion via signal line 572 to the FCS transmit circuit 560. An underrun detect signal generated by transmit buffer 554 is conducted to the DLC receive side 152 for storage in the fifth bit position of the DMR2 register. The output from the FCS generator 560 is conducted in serial fashion to the zero insertion circuit 558 and the resulting D-channel transmit frame is conducted therefrom to the LIU 110.

A 16-bit transmit address register is contained within the transmit address buffer circuit 552 and is read/write user accessible from the MPC 38 via the D$_{0-7}$ bus and MPI 100. The 16-bit D-channel transit byte count register 564 is similarly read/write user-accessible. The transmit control circuit 550 contains a register decode portion which receives the "Z" bits indicating the indirect address of the register to be read from or written to from the command register 302 of MPI 100, and as described in connection with the MPI 100, above, in accordance with Table VII. The manner and apparatus used within DLC 150 to effect subscriber-control of the registers controlling the information and control fields shown in FIG. 2C, above, are similar to the manner and apparatus used within the MUX 170 to provide subscriber-control of the MCR1-3 and reference should be had to the related, co-pending application for a detailed description of those aspects of the MUX 170.

H. DSC Initialization Procedure

The DSC 34 of the present invention is initialized in accordance with a user-programmable eight-bit initialization (INIT) register accessible to the MPC 38. Table VIII, below, describes the significance of the contents of the INIT register. When a reset is applied to the DSC 34, the DSC will initially have the default status indicated in Table VIII. As indicated in Table VIII, the DSC will enter the "idle" mode; the DSC 34 is in this mode whenever INIT[0] and INIT[1] are ZERO. Also the external crystal frequency of 12,288 MHz, as applied to the DSC 34 at terminals XTAL1 and XTAL2, is divided by four and subsequently made available at a master clock (MCLK) terminal (not shown) of the DSC 34. In the idle mode, the DLC 150, the MAP 160, and the MUX 170 are disabled, but the MPI 100, the OSC 180 and the POW 190 circuits are enabled as is the LIU 110 detection circuitry. The MPC 38 programmed state of the DSC 34 is maintained, hence the coefficient RAM of the MAP 160 and the programmable registers retain their contents. The MPC 38 can access any of the programmable registers within the DSC while in the idle mode.

Figure 17:
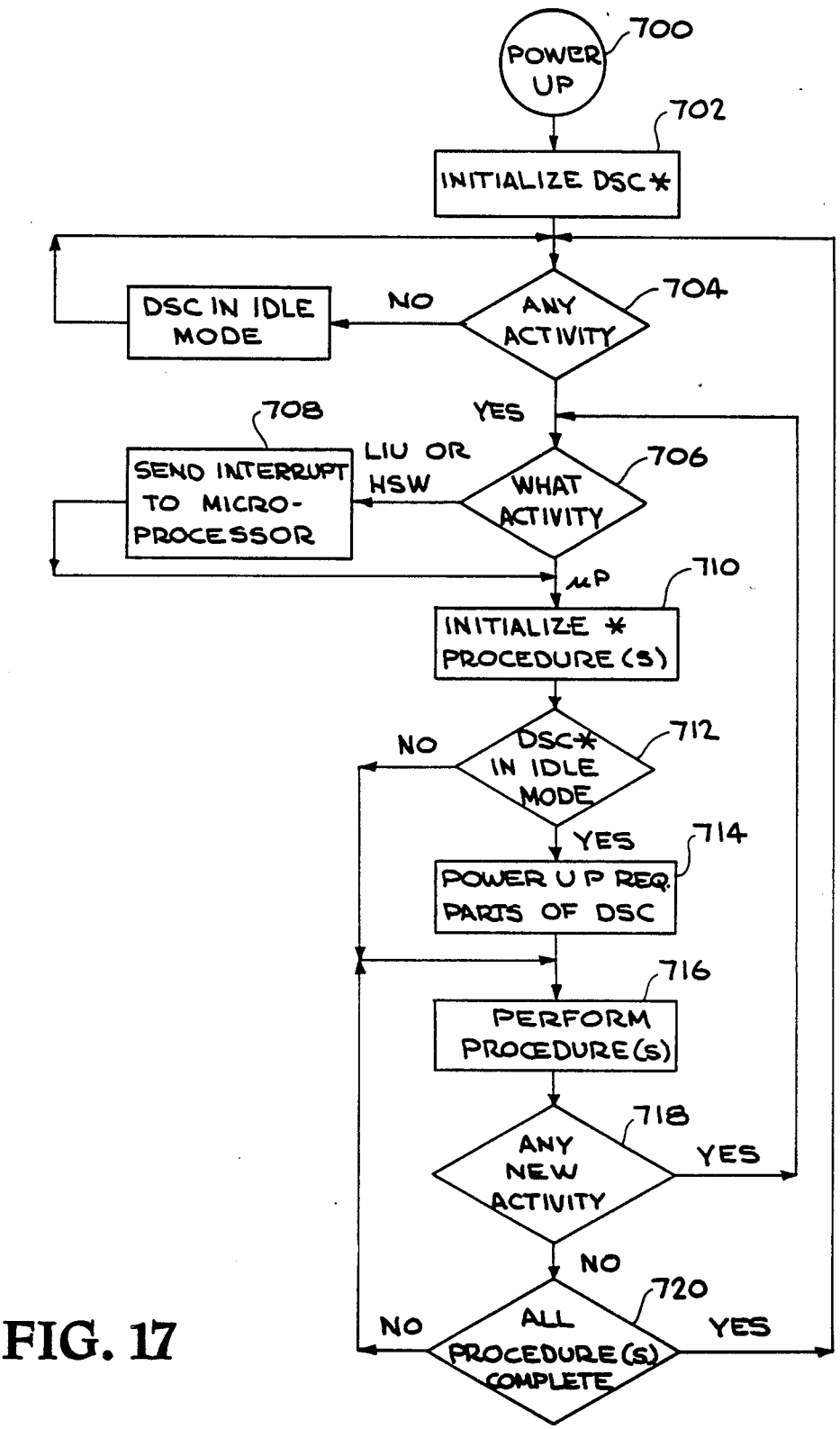
FIG. 17 is a flowchart depicting the power-up and initialization procedure of the DSC of the present invention.

A flowchart of the DSC 34 power-up and initialization procedures is given as FIG. 17. The initial power-up is shown as occurring in symbol 700 followed by the default initialization within symbol 702, as just described. The DSC 34 is therefore placed in the idle mode upon exit from block 702 into decision diamond 704.

TABLE VIII

| INIT Bit Position(s) | Initialization Register | |
|---|---|---|
| | If Content(s) are: | If Content is: Meaning |
| 0,1 | 0,0 | DSC 34 in idle mode (Default) |
| | 1,0 | Power-up DSC 34 except MAP 160 |
| | 0,1 | Power-up DSC 34 |
| | 1,1 | Not used |
| 2 | Not used | |
| 3,4,5 | 0,0,0 | Divide Clock by 4 (Default) |
| | 1,0,0 | Divide Clock by 1 |
| | 0,1,0 | Divide Clock by 2 |
| | 0,0,1 | Divide Clock by 3 All other combinations default to Divide Clock by 4 |
| 6 | 1 | Receive abort |
| | 0 | No receive Abort (Default) |
| 7 | 0 | No transmit Abort (Default) |

The idle mode of the DSC 34 can be terminated in any one of three ways as best illustrated with reference to the diamond 706 leading from diamond 704 of flowchart of FIG. 17:

(1) When the LIU 110 detects activity on the "S" interface 32, the CCITT actuation procedure is undertaken in accordance with Table III, above. This is shown by the left-pointing arrow leaving diamond 706 and labelled "LIU". As shown in flowchart box 708, an interrupt is generated at the ~INT terminal of the DSC 34 in accordance with the contents of the LSR 426 following reception of INFO 4. [i.e., when the LIU 110 moves to state F7, as described in connection with Table XIII, above.] As a result, the MPC 38 causes bit position 1 within the INIT register to be set to ONE and the DSC 34 accordingly enters the "power-up" mode, as shown in flowchart box 714.

As shown in FIG. 17, the path from box 708 to 714 includes a box 710 in which the MPC 38 can access the INIT register to modify its contents from the default values shown in Table VIII, above. Also included in the path is a decision diamond 712 which determines whether the MPC 38 has undertaken an initialization procedure during a non-idle mode.

(2) The second method of terminating the idle mode is when the signal at the HSW terminal of the DSC 34 change state and HSW interrupt is enabled in accordance with the contents of the LSR 426. The "HSW" arrow leaving diamond 706 leads to box 708 of FIG. 17 and an interrupt is generated by the DSC 34 which causes MPC 38 to read the contents of the LSR 426 and resulting in a power-up of the DSC 34 in accordance with the contents of the LSR 426 and the initialization procedure defined by the contents of the INIT register.

(3) A third method of terminating the idle mode is by the MPC 38 writing a ONE into either the 0 or 1 bit positions of the INIT register. This is shown on FIG. 17 by the downward arrow leaving the diamond 706 labelled "MPC". By entering the box 710, the MPC 38 undertakes the initialization procedure indicated and thereupon passes through decision diamond 712 to the power-up box 714.

As shown in the flowchart of FIG. 17, upon power-up of the DSC 34 at box 714, a procedure performance box 716 is entered and the DSC 34 undertakes to perform the procedure on the data at the "S" interface 32 as described elsewhere. Should any new activity occur at the "S" interface 32 as detected by the LIU 110, the decision diamond calls for that new activity to be monitored and, accordingly, control is passed back to decision diamond 706 for processing in accordance with the flowchart portions 706, 708 and 710.

At any time no new activity is detected, flow passes from decision diamond 718 to a decision diamond 720 which determines whether the present procedures resulting from the latest activity at the "S" interface 32 have been completed, in which case control passes back to decision diamond 704 and the DSC "idle" mode is reentered. If further procedures remain, control passes to box 716.

We claim:

1. A controller for use with subscriber telephone equipment providing subscriber-selectable bidirectional data paths between a plurality of analog voice interfaces providing a plurality of analog ports and a plurality of digital data interfaces providing a plurality of time-multiplexed serial ports, and a subscriber interface to a digital telecommunication network having plurality of voice/data channels and a plurality of control/data channels, said data path selection effected by subscriber-programmable means operably connected to said controller for receiving and storing subscriber commands and for generating on a bus external to said controller said subscriber commands, said controller comprising:

clock means for generating timing signals;

a plurality of internal bidirectional control/data busses;

at least a first, a second, a third and a fourth internal bidirectional data bus;

control logic and programming interface means providing at least one of said plurality of digital data interfaces connected to said external bus and to said internal control/data busses responsive to said subscriber commands for generating on said internal control busses signals representative of said subscriber-selected data paths;

multiplexer means connected to said internal control/data busses, providing at least one of said plurality of time-multiplexed send/ports integral with said multiplexer means, responsive to said control signals generated by said control logic and programming interface means for establishing said subscriber-selected data paths and for generating time-multiplexed signals at said integral serial port;

line interface means connected to said subscriber interface and connected to said control logic and programming interface means via said internal control/data busses and connected to said multiplexer means via said first internal bidirectional data bus for receiving from, and transmitting signals onto, said subscriber interface and for receiving and transmitting onto said first internal bidirectional data bus said voice/data signals; and main audio processor means providing at least one of said plurality of analog interfaces connected to said control logic and programming interface means via said internal control/data busses and connected to said multiplexer means via said second internal bidirectional data bus for receiving from, and transmitting signals onto, subscriber-selectable ones of said analog ports and for processing signals received on said second bidirectional data bus.

2. A subscriber controller according to claim 1 wherein said digital data interface provided by said control logic and programming interface means includes at least first and second time-multiplexed digital data channels, wherein said digital data interface provided by said port integral with said multiplexer means includes at least third, fourth and fifth time-multiplexed digital data channels, wherein said digital data interface provided by said line interface means provides at least first and second voice/data channels of said plurality of voice/data channels present at said subscriber interface and wherein said analog interface provided by said main audio processor means includes at least a first analog data channel; and wherein each said subscriber-selected data path established by said multiplexer means includes paths having a source and a destination subscriber-selectable from: said first analog data channel, said first, said second, said third, said fourth, and said fifth time-multiplexed digital data channels, and said first and second voice/data channels.

3. A subscriber controller according to claim 2 wherein said subscriber-programmable means is a digital microprocessor and said subscriber-data-path selection is effected by receipt by said digital microprocessor of said subscriber commands and subsequent generation therefrom to said control logic and programming interface means portion of said controller of control signals representative of said subscriber-selected data path source and destination in accordance with the following relationship:

| Control Signal | Subscriber-Selected Source/Destination |
|---|---|
| 0000 | No connection |
| 0001 | Said first voice/data channel |
| 0010 | Said second voice/data channel |
| 0011 | Said first analog data channel |
| 0100 | Said first digital data channel |
| 0101 | Said second digital data channel |
| 0110 | Said third digital data channel |
| 0111 | Said fourth digital data channel |
| 1000 | Said fifth digital data channel |

4. A subscriber controller according to claim 3 wherein said subscriber command further includes a register address portion, and said multiplexer means includes a plurality of addressable storage register means connected to said internal control/data busses, for storing for each subscriber-selected path a source/destination, said source and said destination control signal, each said path source/destination having an address generated by said control logic and programming interface means forming said register address portion of said subscriber command, said address determinative of which of said plurality of addressable storage register means is to store said source and said destination control signal for said subscriber-selected path source/destination.

5. A subscriber controller according to claim 4 wherein said multiplexer means includes three said addressable storage register means and said subscriber-selectable bidirectional data paths comprises each of three source and three destinations selected from said eight source/destinations.

6. A subscriber controller according to claim 1 further data link control means connected to said control logic and programming interface means via said internal control/data busses and via said fourth data bus, and connected to said line interface means via said third data bus, responsive to said control signals generated by said control logic and programming interface means for receiving on said control/data channel from said line interface means via said third data bus and transmitting to said control logic and programming interface means via said fourth data bus signals on said control/data channel at said subscriber interface and for receiving from said control logic and programming interface means via said fourth data bus and transmitting to said line interface means via said third data bus signals to be placed on said control data channel at said subscriber interface.

7. A subscriber controller according to claim 6 wherein said multiplexer means further includes addressable storage register means for storing said source and destination signals, each said path source/destination having an address generated by said control logic and programming interface means as a portion of said register command signal, said section code contents of said command register means being that of said multiplexer means and said operational code contents of said command register means being determinative of said address generated by said control logic and programming interface.

8. A controller for use with subscriber telephone equipment providing subscriber-selectable bidirectional data paths between a plurality of analog voice interfaces providing a plurality of analog ports and a plurality of digital data interfaces providing a plurality of time-division multiplexed serial ports, and a subscriber interface to a digital telecommunication network having a plurality of voice/data channels and a plurality of control/data channels, said data path selectional effected by subscriber-programmable digital microprocessor means operably connected to said controller for receiving and storing subscriber commands and for generating on a bus external to said controller said subscriber commands, said subscriber data path selection is effected by receipt by said digital microprocessor of said subscriber commands and subsequent generation therefrom to said control logic and programming interface means portion of said controller of control signals representative of said subscriber-selected data path selection, said control signals further include a section code portion and an operation code portion, said controller comprising:

clock means for generating timing signals;

a plurality of internal bidirectional control/data busses;

at least a first, a second, a third and a fourth internal bidirectional data bus;

control logic and programming interface means providing at least one of said plurality of digital data interfaces connected to said external bus and to said internal control/data busses responsive to said subscriber commands for generating on said internal control busses signals representative of said subscriber-selected data paths;

multiplexer means connected to said internal control/data busses, providing at least one of said plurality of time-multiplexed send/ports integral with said multiplexer means, responsive to said control signals generated by said control logic and programming interface means for establishing said subscriber-selected data paths and for generating time-multiplexed signals at said integral serial port;

line interface means connected to said subscriber interface and connected to said control logic and programming interface means via said internal control/data busses and connected to said multiplexer means via said first internal bidirectional data bus for receiving from, and transmitting signals onto, said subscriber interface and for receiving and transmitting onto said first internal bidirectional data bus said voice/data signals; and main audio processor means providing at least one of said plurality of analog interfaces connected to said control logic and programming interface means via said internal control/data busses and connected to said multiplexer means via said second internal bidirectional data bus for receiving from, and transmitting signals onto, subscriber-selectable ones of said analog ports and for processing signals received on said second bidirectional data bus;

wherein said control logic and programming interface means includes command register means responsive to said control signals, for storing said section and operational code portions of said control signals, and said control logic and programming interface means further generates register command signals to said controller section specified by said section code contents of said command resister means to said addressable register within said section specified by said operational code contents of said command register means.

* * * * *